(12) United States Patent
Cooper et al.

(10) Patent No.: US 9,358,940 B2
(45) Date of Patent: Jun. 7, 2016

(54) SYSTEM AND METHOD FOR CONFIGURING AN INTERIOR OF A VEHICLE BASED ON PREFERENCES PROVIDED WITH MULTIPLE MOBILE COMPUTING DEVICES WITHIN THE VEHICLE

(71) Applicant: QUALCOMM Incorporated, San Diego, CA (US)

(72) Inventors: Rotem Cooper, San Diego, CA (US); Frank Lane, Easton, PA (US); Sunvir Gujral, San Diego, CA (US); Paul Jacobs, La Jolla, CA (US); Ravinder Chandhok, Del Mar, CA (US); Liat Ben-Zur, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/550,902

(22) Filed: Nov. 21, 2014

(65) Prior Publication Data
US 2015/0149042 A1    May 28, 2015

Related U.S. Application Data

(60) Provisional application No. 61/907,994, filed on Nov. 22, 2013, provisional application No. 62/081,483, filed on Nov. 18, 2014.

(51) Int. Cl.
*B60R 16/03* (2006.01)
*B60R 16/037* (2006.01)
*E05F 15/77* (2015.01)

(52) U.S. Cl.
CPC ............... *B60R 16/037* (2013.01); *E05F 15/77* (2015.01)

(58) Field of Classification Search
CPC .... B60R 16/023; B60R 16/037; B60R 16/0315; E05F 15/77
USPC ......... 701/2, 45, 48, 49, 34.4; 455/41.1, 41.2; 340/426.13, 426.15, 426.16, 426.17, 340/426.2, 426.28, 426.35, 426.36
See application file for complete search history.

(56) References Cited

U.S. PATENT DOCUMENTS

| | | |
|---|---|---|
| 7,483,964 B1 * | 1/2009 | Jackson et al. ................ 709/221 |
| 8,736,438 B1 | 5/2014 | Vasquez et al. |

(Continued)

FOREIGN PATENT DOCUMENTS

| | | |
|---|---|---|
| DE | 102012211731 A1 | 5/2014 |
| KR | 101031490 B1 | 4/2011 |

OTHER PUBLICATIONS

"Human Factors (HF); Intelligent Transport Systems (ITS); ICT in cars", Technical Report, European Telecommunications Standards Institute (ETSI), 650, Route Des Lucioles ; F-06921 Sophia-Antipolis ; France, vol. HF, No. V1.1.1, Apr. 1, 2010, XP014046275, pp. 24-34,60.

(Continued)

*Primary Examiner* — Thomas Tarcza
*Assistant Examiner* — Tyler J Lee
(74) *Attorney, Agent, or Firm* — Paradice and Li, LLP

(57) ABSTRACT

In response to detecting the entry condition, a determination is made as to when multiple mobile computing devices are present within the vehicle. An occupancy zone is determined for each multiple mobile computing device that is determined as being present within the vehicle. Profile information is determined for each mobile computing device. At least one of an operational or usage facet of the vehicle can be configured at each occupancy zone in which one of the mobile computing devices is determined to be present. The operational or usage facet of the vehicle at a location of each occupancy zone can be based at least in part on the profile information determined from the mobile computing device that is deemed to be present at that occupancy zone.

31 Claims, 22 Drawing Sheets

(56) References Cited

U.S. PATENT DOCUMENTS

| | | |
|---|---|---|
| 8,744,397 B2 * | 6/2014 | Gee et al. ............ 455/404.1 |
| 8,868,254 B2 | 10/2014 | Louboutin |
| 2005/0017842 A1 * | 1/2005 | Dematteo ............ 340/5.72 |
| 2011/0195699 A1 | 8/2011 | Tadayon et al. |
| 2011/0237186 A1 | 9/2011 | Preissinger et al. |
| 2012/0086249 A1 * | 4/2012 | Hotary et al. ........ 297/284.3 |
| 2012/0208519 A1 | 8/2012 | Seaver |
| 2012/0326855 A1 | 12/2012 | Bantz et al. |
| 2013/0099892 A1 | 4/2013 | Tucker et al. |
| 2013/0145065 A1 | 6/2013 | Ricci |
| 2013/0198802 A1 | 8/2013 | Ricci |
| 2013/0217331 A1 | 8/2013 | Manente |
| 2013/0226371 A1 * | 8/2013 | Rovik et al. ............ 701/2 |
| 2013/0281021 A1 | 10/2013 | Palin et al. |
| 2014/0142783 A1 | 5/2014 | Grimm et al. |
| 2014/0163774 A1 | 6/2014 | Demeniuk |
| 2014/0297220 A1 | 10/2014 | Raffa et al. |
| 2014/0306814 A1 | 10/2014 | Ricci |
| 2014/0309893 A1 * | 10/2014 | Ricci .................... 701/49 |
| 2015/0088337 A1 * | 3/2015 | Toohy et al. ............ 701/1 |
| 2015/0210287 A1 * | 7/2015 | Penilla et al. .......... 701/49 |

OTHER PUBLICATIONS

International Search Report and Written Opinion—PCT/US2014/066976—ISA/EPO—Mar. 25, 2015.

Chu H., et al., "I am a Smartphone and I Know My User is Driving," 6th International Conference on Communication Systems and Networks (COMSNETS), Jan. 2014, pp. 8.

Continental: "Two Decades of Remote Access Key Expertise," Nov. 15, 2013, 2 pages.

He Z., et al., "Who Sits Where? Infrastructure-Free In-Vehicle Cooperative Positioning via Smartphones," Sensors, 2014, vol. 14, pp. 11605-11628.

OnStar, LLC Productivity, "OnStar Remote Link," Jul. 7, 2014, 2 pages.

Patently Apple: "Apple Reveals Advanced Automotive Access & Control System," Apr. 25, 2013, [Retrieved date on Sep. 25, 2014], Retrieved from the Internet < URL: http://www.patentlyapple.com/patently-apple/2013/04/apple-reveals-advanced-automotive-access-control-system.html >, 9 pages.

\* cited by examiner

RF Antenna 640

Figure 3: Shared Key Capabilities

| |
|---|
| Valid time range for shared key |
| Geofence region allowed |
| Trunk Access Allowed |
| Glove compartment access allowed |
| Maximum Speed Allowed |
| Digital Signature derived from Owners Digital Key |

730 → Geofence region allowed

Figure 4: Driver Preferences

| |
|---|
| Music/radio stations preference |
| Climate control setting preference (temperature, fan setting) |
| Seat and steering wheel position preference |
| Driving mode preference (Normal, Sport, Economy) |
| ... |
| ... |

FIG. 7D

SYSTEM AND METHOD FOR CONFIGURING AN INTERIOR OF A VEHICLE BASED ON PREFERENCES PROVIDED WITH MULTIPLE MOBILE COMPUTING DEVICES WITHIN THE VEHICLE

CROSS-REFERENCE TO RELATED APPLICATIONS

This application is a non-provisional filing that claims the benefit of U.S. Provisional Patent Application No. 61/907,994 filed Nov. 22, 2013 entitled "Mobile Computing Device for Operating a Vehicle," and U.S. Provisional Patent Application No. 62/081,483 filed Nov. 18, 2014 entitled "Automobile Passenger Position Detection by Time and Motion Correlation," both of which applications are fully incorporated herein by reference.

TECHNICAL FIELD

Various embodiments described herein generally relate to a system and method for configuring an interior of a vehicle based on preferences of preferences provided with multiple mobile computing devices within the vehicle.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. However, despite the fact that IoT capable devices can provide information about the general location of themselves, known conventional location methods have low precision and are unsuited to circumstances where the difference of feet or inches is important. For example, GPS and acoustic position determination methods may not be accurate enough to determine in which seat inside a vehicle a device is located, especially while the vehicle is in motion.

Key fobs are a common feature with new automobiles. Conventional fobs are typically carried in the user pocket and enable actions such as keyless entry and ignition starts for the user. Some key fobs can automate the act of unlocking a vehicle door when the user is nearby. Additionally, under conventional approaches, a vehicle can often store a set of preferences for a given fob, such as preferred seat position(s) and/or preset radio stations. This allows a vehicle to identify a fob and further to implement the preferences that are stored with an identifier of the fob.

SUMMARY

In one aspect of the disclosure, a mobile computing device is operated to control a vehicle. A digital key for accessing a vehicle is stored for accessing the vehicle. Profile information is associated with the digital key for configuring operation and/or use of a vehicle. The profile information may include one or more outside parameters for implementing one or more pre-entry vehicle configurations. When one or more proximity conditions are detected as being satisfied as between the mobile computing device and the vehicle, a communication is sent to the vehicle in order to cause the vehicle to implement one or more pre-entry vehicle configurations. The communication can be based on the digital key and may specify the one or more outside parameters.

In another aspect, a vehicle receives one or more communications from a mobile computing device. The communications may be communicated using a short-range wireless port and may including a digital key and one or more outside parameters for implementing one or more vehicle configurations. The vehicle authenticates the digital key to provide access to the vehicle, and then implements one or more vehicle configurations prior to occurrence of an event signifying that the mobile computing device is inside the vehicle.

Still further, according to one aspect of the disclosure, a mobile computing device communicate with at least one of (i) one or more other mobile computing devices in the vehicle, or (ii) a controller of the vehicle. The mobile computing device determines, from communicating with the one or more other devices in the vehicle, when multiple mobile computing devices are present within the vehicle. The mobile computing device determines an occupancy zone for each mobile computing devices that is determined as being present within the vehicle. Additionally, the mobile computing device determines profile information for each mobile computing device. The mobile computing device further initiates configuration of at least one of an operational or usage facet of the vehicle at each occupancy zone in which one of the mobile computing devices is determined to be present. The operational or usage facet of the vehicle provided at a location of each occupancy zone can be based at least in part on the profile information determined from the mobile computing device that is deemed to be present at that occupancy zone.

According to an aspect of the disclosure, a method includes detecting an entry condition of a vehicle. In response to detecting the entry condition, a determination is made as to when multiple mobile computing devices are present within the vehicle. An occupancy zone is determined for each multiple mobile computing device that is determined as being present within the vehicle. Profile information is determined for each mobile computing device. At least one of an operational or usage facet of the vehicle can be configured at each occupancy zone in which one of the mobile computing devices is determined to be present. The operational or usage facet of the vehicle at a location of each occupancy zone can be based at least in part on the profile information determined from the mobile computing device that is deemed to be present at that occupancy zone.

According to another aspect, a vehicle includes a controller, a set of interfaces to operational and usage facets of the vehicle, a short-range wireless port, and a sensor input or output resource provided with or in proximity to each seat. The controller operates to determine a sensor comparison profile for each seat from the sensor input or output resource provided with or in proximity to each seat. A sensor output profile is determined from a motion sensor of each mobile computing device in a set of mobile computing devices. A seat position is then determined for each mobile computing device of the set based on a comparison of the sensor output profile from the motion sensor of each of the mobile computing devices of the set and the sensor comparison profile for each seat. The controller obtains profile information from one or more of the mobile computing devices in the set, and initiates, through the set of interfaces to operational and usage facets of the vehicle, configuration of multiple operational or usage facets of the vehicle. In particular, the controller implements configuration of a specific operational or usage facet using profile data of the mobile computing device that is at the seat position which is in closest proximity to the specific operational or usage facet.

According to another aspect, a vehicular system includes a vehicle sub-system comprising a controller, a set of interfaces to operational and usage facets of the vehicle, a short-range wireless port, and a sensor input or output resource provided with or in proximity to each seat. The vehicular system also includes a set of multiple mobile computing devices, with each mobile computing device including a processor, a memory resource and a motion sensor. The vehicle sub-system and each of the set of multiple computing devices can operate a communication platform for communicating with each other in order to establish a network of multiple devices within the vehicle. At least one of the multiple devices of the network (i) operates the input or output resource to generate a sensor comparison profile for each seat; (ii) determines a sensor output profile for a specified duration from the motion sensor of each of the mobile computing devices of the set; (iii) uses one of position determination logic or sensor correlation logic to determine a seat position of each mobile computing device of the set; (iv) obtains profile information from one or more of the mobile computing devices in the set; and (v) initiates, from the controller of the vehicle sub-system through the set of interfaces to operational and usage facets of the vehicle, configuration of multiple operational or usage facets of the vehicle. These configurations include configuration of a specific operational or usage facet using profile data of the mobile computing device in the set that is at the seat position which is in closest proximity to the specific operational or usage facet.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 7A through FIG. 7D illustrate examples of message structures for messages that can be sent by a mobile computing device to a vehicle in connection with use of a digital key to access the vehicle.

DETAILED DESCRIPTION

Figure 1:
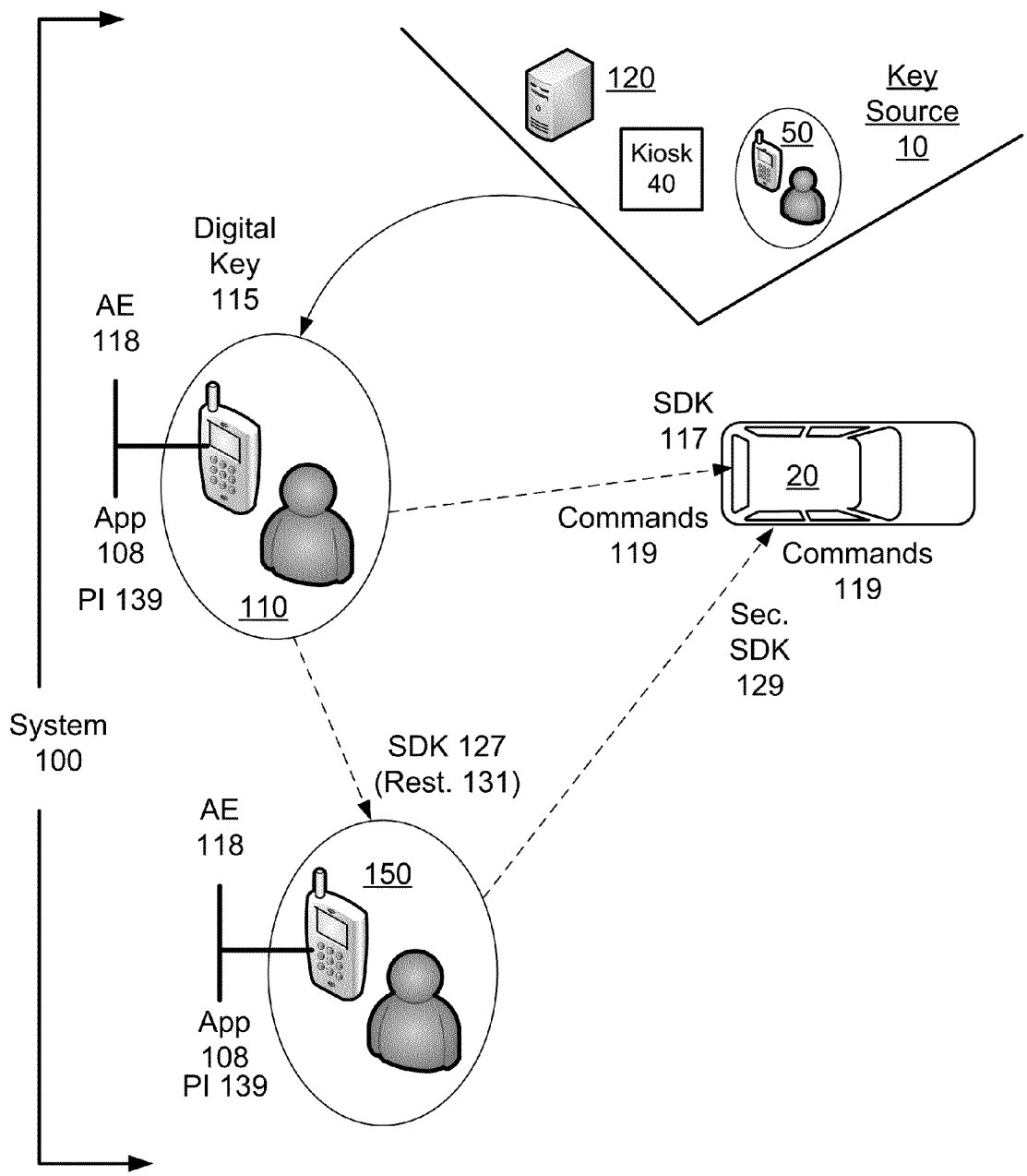
FIG. 1 illustrates an example system for enabling a mobile computing device to operate as a digital key for a vehicle, according to one or more embodiments.

Various aspects are disclosed in the following description and related drawings to show specific examples relating to exemplary embodiments of a system and method for determining a seat location of a mobile computing device in a multi-seat environment. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, the sequences of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

As used herein, a "seat location" in context of a mobile computing device is intended to mean the likely seat location of a user of the mobile computing device. For example, a user may hold a mobile computing device in his or her hand, or have a mobile computing device on his or her body, while occupying a particular seat, or the user may place their mobile computing device on an adjacent console. Thus, while reference may be made to a "seat location" for a mobile computing device, in many examples, the mobile computing device may be held slightly off-seat and/or positioned in the hands or belongings of a user.

Embodiment described herein provide for a mobile computing device that operates to control access to and/or use of a vehicle.

According to some embodiments, a mobile computing device operates to receive a digital key from a network service. The mobile computing device uses the digital key to establish a relationship with a vehicle. In subsequent instances, the mobile computing device communicates with the vehicle, so as to provide the vehicle with an exchanged digital key that can subsequently be used to authenticate the mobile computing device and to decrypt input from the mobile computing device.

In some embodiments, the mobile computing device transmits an encrypted command to the vehicle to enable use of the vehicle when a proximity condition is satisfied as between the mobile computing device and the vehicle. The command can be encrypted using the digital key received from the network service. The vehicle can decrypt the command using an exchanged digital key received previously from the mobile computing device.

Examples described herein further provide for a mobile computing device to control a vehicle. According to some embodiments, a mobile computing device receives a digital key from a network service. The mobile computing device determines an exchanged digital key for the vehicle using the digital key that is received from the network service. The mobile computing device communicates the exchanged digital key to the vehicle when one or more proximity conditions are satisfied. Subsequently, the mobile computing device can transmit input to the vehicle using the digital key. The input can be authenticated and decrypted by the vehicle in order to provide entry and/or enable or control operation of the vehicle.

According to some embodiments, the digital key received from the network service and the exchanged digital key form an asymmetric key pair.

Still further, in some embodiments, the input transmitted from the mobile computing device includes an encrypted command that can be decrypted by the vehicle using the exchanged digital key. By way of example, the command can correspond to a command to unlock the vehicle or a command to start the vehicle.

In some variations, the mobile computing device executes an application in order to perform operations of receiving the digital key, determining the exchanged digital key and determining when one or more proximity conditions are satisfied for communicating the exchanged digital key.

In some embodiments, a proximity condition can correspond to the mobile computing device being able to successfully transmit a command that is transmitted to the vehicle using a short-range wireless medium (e.g., through use of Bluetooth, Wireless Fidelity, or near-field communications ("NFC")).

In some embodiments, a location of the mobile computing device is determined within the vehicle. Additionally, use of the mobile computing device is based on the determined location.

Among other benefits, examples such as described herein enable a vehicle authentication and security system which utilizes a device (e.g., mobile phone) that many consumers have in their possession. This avoids cost that would otherwise be associated with, for example, manufacturing and distributing conventional key fobs.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates an example system for enabling a mobile computing device to operate as an access key and configuration mechanism for a vehicle. A vehicle 20 of an example of FIG. 1 can correspond to any vehicle, such as an automobile, passenger van or bus, motorcycle, airplane, truck, tractor etc. in an example of FIG. 1, a system 100 includes anyone of multiple possible key sources 10 that can communicate a digital key for accessing and/or operating a vehicle 20. The key sources 10 include any entity that securely transmits either a digital access key for a vehicle, or alternatively, a data set for use in creating or enabling such a digital access key.

In an example of FIG. 1, the key source 10 includes a network key service implemented by a server 120, a kiosk 40 and/or another mobile computing device 50. The server 120 can be provided as part of a network service 112. The mobile computing device 110 can correspond to a multi-functional computing device, such as a computing device capable of wireless telephony, messaging and Internet communications. By way of example, the mobile computing device 110 can correspond to a smart phone, tablet, laptop, or netbook.

According to some examples, server 120 is a key source for providing an original or first-time-in-use digital access key for a particular vehicle. As described below, a user of mobile computing device 110 can receive a digital key 115 from network service 120, and the digital key 115 can correspond to an original or first-time-in-use key for the vehicle 20. In one example, mobile computing device 110 operates to generate a second key ("shared digital key 117"), which is shared with the vehicle 20. The shared digital key 117 enables the vehicle to recognize the mobile computing device 110 of the user in subsequent encounters. Thus, once the shared digital key 117 is established, the digital key 115 of the mobile computing device can obtain access of the vehicle when proximity conditions are satisfied (e.g., when short-range wireless communication is possible).

In some variations, key source 10 provides the mobile computing device 110 with a digital access key 115 that is established with the vehicle 20. For example, the vehicle 20 can correspond to a rental car, and the kiosk 40 and/or mobile computing devices they may belong to operative the rental car agency. Alternatively, as described in more detail below, the key source 10 can correspond to mobile computing device 50 (e.g., owner), who elects to share the vehicle with another driver (e.g., family member, valet, etc.). Such an example is illustrated further in detail below, in context of mobile computing device 110 providing the second mobile computing device 150 with a second exchanged digital key 127. Rather than transmitted in the original digital access key 115 to the user, the rental car agency can communicate the established digital access key 115. In contrast to the original digital access key 115, the established digital key 115 is not require an initial pairing process by which a shared digital key 117 is transmitted to the vehicle 20. Rather, the established digital access key 115 communicates with the vehicle 20, which in turn utilizes an existing digital access key that is already paired with or otherwise compatible with the established digital access key 115. As described below, this allows the operator/owner to, for example, communicate a digital access key 115 for use with the vehicle 20, while maintaining a separate key that can also access the vehicle.

In some embodiment, the mobile computing device 110 communicates with the server 120 across one or more networks to receive a digital key 115 for operating the vehicle 20. The digital key 115 can correspond to an encrypted data element. The vehicle 20 can then perform a first process to implement the digital key on the vehicle as a security measure.

According to some embodiments such as described with an example of FIG. 1, the mobile computing device 110 and the vehicle 20 implement an asymmetric key exchange in which the mobile computing device 110 uses the digital key 115 provided from the server 120 to generate an exchanged digital key 117 for the vehicle 20. As further described with an example of FIG. 1, the mobile computing device 110 uses the digital key 115 to encrypt commands or other communications (e.g., open vehicle door) for the vehicle 20, and the vehicle 20 uses the exchanged digital key 117 to decrypt the communications from the mobile computing device 110. In this way, the vehicle 20 does not require independent communications with the server 120, but rather can receive data elements from the mobile computing device 110 for performing decryption and authentication.

In variations, the mobile computing device 110 and the vehicle 20 implement a symmetric type key exchange in which the mobile computing device 110 and the vehicle 20 utilize a common key. For example, the mobile computing device 110 can provide a common digital key to the vehicle 20 based on the digital key 115 received from the server 120.

According to some embodiments, the mobile computing device 110 communicates with server 120 using an application. For example, the mobile computing device 110 can download an application 108 from the network service 112, or from an "app" store. The mobile computing device 110 can execute the application 108 in order to access the server and receive the digital key 115. Furthermore, the mobile computing device 110 can utilize the application in order to generate the exchanged digital key 117 for the vehicle 20. In particular, the application 108 can include or provide an authentication engine 118 from which the mobile computing device 110 can generate one or more exchanged digital keys 117 (e.g., for vehicle), 127 (e.g., for use with other devices).

In one implementation, the digital key 115 can be used to provide an input to the authentication engine 118. The authentication engine 118 can receive the input of the digital key 115 as one input, in addition to one or more other inputs from another source. The other inputs can be random and/or generated from other information, such as vehicle-specific information. The authentication engine 118 can return, as output, an exchanged digital key 117. In one embodiment, the exchanged digital key 117 can be communicated by the mobile computing device 110 (e.g., via the application 108) to the vehicle 20. As described below, the vehicle 20 can use the exchanged digital key 117 to authenticate the mobile computing device 110, including authenticate commands and other input provided from the mobile computing device 110.

According to one aspect, the server 120 communicates the digital key 115 to the mobile computing device 110, and the user then pairs the mobile computing device 110 with the vehicle. In one implementation, the pairing process can include the mobile computing device 110 communicating the exchanged digital key 117 to the vehicle. The vehicle 20 subsequently uses the exchanged digital key 117 to authenticate and decrypt input from the mobile computing device 110. In one implementation, the vehicle 20 uses the exchanged digital key 117 to decrypt commands 119 received from the mobile computing device 110. In some implementations, the vehicle 20 can be equipped with receivers and circuitry to enable certain actions to be performed by the vehicle 20 even when the vehicle is in the off-state. For example, the vehicle 20 can include a receiver and logic to receive the exchanged digital key 117 so as to complete the pairing process, even when in the off-state.

After pairing, the mobile computing device 110 and the vehicle 20 communicate when the mobile computing device is in sufficient proximity so as to satisfy a proximity condition. In one implementation, when proximity conditions are satisfied, the mobile computing device is able to communicate commands 119 such as "unlock" and/or "start" in encrypted form to the vehicle 20 using the digital key 115. In turn, the vehicle 20 can authenticate the mobile computing device 110, as well as decrypt and process the commands 119 using the exchanged digital key 117. Such a pairing process provides one example for how the mobile computing device 110 can provide the mechanism to the vehicle 20 for processing the secured communications that carry the commands for operating the vehicle.

In this way, the server 120 can provide the digital key 115 to the mobile computing device 110, and the vehicle 20 can use the exchanged digital key 117 to authenticate the device and to decrypt the commands 119. As a result, the vehicle 20 does not need an independent or separate connection with the server 120 in order to pair with the mobile computing device 110 and subsequently authenticate the mobile computing device 110 and process commands 119.

The pairing between the mobile computing device 110 and the vehicle 20 can be proximity pairing, meaning that one or more proximity conditions are required to be satisfied before pairing can be accomplished. The pairing condition(s) can identify a general proximity between the mobile computing device 110 and the vehicle 20. Additionally, subsequent commands 119 issued by the mobile computing device 110 can also be processed by the vehicle 20 if/when proximity conditions are satisfied. The proximity conditions may require that the mobile computing device 110 be within a distance or range from the exterior of the vehicle 20. As an alternative or variation, the proximity conditions may require that the mobile computing device 110 satisfy other types of proximity conditions, such as the mobile computing device 110 being proximate (by some threshold) but outside of the vehicle. The determination of the mobile computing device 110 being outside of the vehicle 20 can be implemented to enable, for example, pre-entry configurations, where the vehicle 20 configures one or more operational (e.g., driving mode) or usage (e.g., seat or steering control, environmental conditions, lighting, etc.) facets of the vehicle when outside of the vehicle 20 (e.g., prior to entering the vehicle).

By way of example, the proximity conditions can be satisfied by the mobile computing device 110 performing the pairing process with the vehicle 20 using a short-range wireless communication medium. Examples of short-range wireless communication mediums include wireless communication protocols provided under standards labeled as Bluetooth (including Bluetooth Low Energy or BTLE), Wireless Fidelity (e.g., 802.11(a), 802.11(b), 802.11 (g), 802.11 (n) etc., collectively termed "Wi-Fi"), Dedicated Short Range Communication ("DSRC"), and wireless Universal Serial Bus (wireless "USB"). Still further, another example of a short-range wireless communication medium for use with examples as described herein includes a near-field communication ("NFC") medium. By way of example, each of the devices can be implemented under IEEE Specifications of 802.11(a), 802.11(b), 802.11(g), or 802.11(n) (collectively "Wi-Fi" or "Wi-Fi network"), or other wireless connection mediums such as Bluetooth, Bluetooth LE, wireless USB. Still further, each of the devices can be implemented to communicate with other devices using a direct, wireless peer-to-peer communication protocol, such as provided by Wi-Fi Direct. Other implementations may include wired network mediums, such as Ethernet or Automotive Ethernet. In order to facilitate communication and interoperability, the mobile computing devices 131, 132, as well as the seat sensors 141, 142, 143, 144 and/or local hub 110 can share a common computing or communication platform, such as provided through ALLJOYN, as hosted by ALLSEEN ALLIANCE. As an addition or variation, a predetermined proximity condition can be defined by the signal strength of a communication from the mobile computing device. For example, the signal strength of input transmitted over Wi-Fi or Bluetooth may be required to be greater than some threshold, thereby ensuring the user is within a particular range of the vehicle (e.g., within 1 m).

As an addition or variation, an initial pairing between the mobile computing device 110 and the vehicle 20 can be performed through a wired connection. For example, the mobile computing device 110 can be connected to a Universal Serial Bus ("USB") port of the vehicle. The physical pairing can provide another inherent safety condition and also provide an example mechanism for implementing a proximity condition for an initial pairing.

Among other benefits, examples as described herein provide inherent security features that guard against unauthorized access to the vehicle 20. Examples as provided herein provide that the vehicle 20 identifies and authenticates the driver (or mobile computing device 110) over secure short range radios (Wi-Fi, Bluetooth, and NFC). The mobile computing device 110 can include processing resources that are sufficient to implement a public/private digital key authentication system with the receipt of digital key 115 and exchange of the exchanged digital key 117. Proximity conditions can further enhance security, and can be enforced using, for example, round trip delay calculation techniques.

FIG. 1 also illustrates an embodiment in which a vehicle owner can implement key management by distributing exchanged digital keys to other mobile computing devices. For example, with reference to an example of FIG. 1, the key source 10 can correspond to another mobile computing (e.g., mobile computing device 110 for mobile computing device 150, or mobile computing device 50 for mobile computing device 110) device that is in possession of the original or first-time-in-use digital access key. In one scenario shown by FIG. 1, the user of mobile computing device 110 can provide another exchanged digital key 127 (e.g., an established digital key) to a second mobile computing device 150 (e.g., the user's guest or spouse). In one implementation, the mobile computing device 110 generates the exchanged digital key 127, and communicates the exchanged digital key 127 to the second mobile computing device 150 either directly (e.g., peer-to-peer communication) or indirectly (via the server 120). According to one aspect, the exchanged digital key 127 can be generated by encrypting a set of inputs on the mobile computing device 110 using the digital key 115. The set of inputs can include, for example, the identifier of the owner, the identifier of the additional user, the identifier of the vehicle 20, and a random number (e.g., number provided from vehicle).

In generating the exchanged digital key 127, the mobile computing device 110 can also attach a set of restrictions 131 that implement the key management functions desired by the user. By way of example, the set of restrictions 131 can include parameters that control how or when the exchanged digital key 127 can be used based on factors such as access type (e.g., how or where the vehicle can be operated), passage of time (e.g., day) or event (e.g., user completes trip). In one implementation, the mobile computing device 110 can attach data corresponding to the set of restrictions 131 directly onto the exchanged digital key 127. The restrictions 131 provide an example of profile information or parameters, which in turn can configure the operation or usage facets of the vehicle. The restrictions 131 can affect operational facets by way of, for example, controlling speed or geofencing the vehicle. As another example, the restrictions 131 can affect usage facets, such as glove box or trunk access.

In an embodiment, once the exchanged digital key 127 is communicated to the second mobile computing device 150, the second mobile computing device 150 can implement a separate asymmetric key process in order to be authenticated by the vehicle 20. In one implementation, the second mobile computing device 150 can also operate the application 108, and further include the authentication engine 118. With the exchanged digital key 127, the second mobile computing device 150 can obtain additional inputs for purpose of generating a secondary exchanged digital key 129 for the vehicle 20 using the authentication engine 118. The additional inputs can include, for example, a random number generated from the vehicle 20. As with the first mobile computing device 110, some embodiments provide for the second mobile computing device 150 to implement proximity pairing with the vehicle 20 in order to communicate or establish the secondary exchanged digital key 129 with the vehicle 20. Once paired, the vehicle 20 can subsequently use the secondary exchanged digital key 129 to authenticate commands and/or other inputs from the second mobile computing device 150. The exchanged digital key 127 of the second mobile computing device 150 can also include attached data elements that correspond to the set of restrictions 131 originating from generation of that exchanged digital key 127 on the mobile computing device 110.

In one implementation, the restrictions 131 can be communicated with input transmitted from the second mobile computing device 150 to the vehicle 20, and the vehicle can implement operations subject to the restrictions 131. In variations, the application 108 (or other programmatic component) running on the second mobile computing device 150 can decrypt the restrictions 131 and limit use of the second exchanged digital key based on the restrictions 131. Among other benefits, such an implementation allows one user (e.g., of mobile computing device 110) to share a "vehicle key" with another user, without actually having to pass a physical key structure or requiring separate network connectivity at the vehicle 20.

In addition to restrictions 131, the digital keys 115 can communicate preferences 139 to the vehicle. The preferences can identify parameters that the vehicle uses to configure operational or usage aspects of the vehicle. By way of example, the preferences can include parameters for selecting operational facets such as driving mode (e.g., valet mode, sports mode, luxury mode, etc.) or geofencing restrictions. Additionally, the preferences can include parameters for selecting usage facets such as seat position, steering wheel position, radio/entertainment center setting, seat or air temperature, lighting, etc.

Each user can store preferences 139 on the respective mobile computing device 110. The preferences can be specific to the vehicle 20, or the preferences can be non-specific to vehicles (e.g., applicable to any digital key the user obtains). Thus, for example, the application 108, can provide an interface to enable the user to enter preference or other profile information, and the application 108 can package or integrate the preferences 139 with digital keys for any particular vehicle, such as digital keys that are received from a rental car counter. To further the example, the user can apply profile information 139 to their own vehicle.

As described with examples, the preference information 139 can include (i) outside or exterior preferences or configurations, implemented when the mobile computing device 110 is outside of the vehicle (e.g., to apply driver or passenger settings pre-entry), (ii) inside or interior preferences or configurations, implemented when the mobile computing device 110 is inside the vehicle, (iii) vehicle preferences or configurations for when mobile computing device occupies a driver zone (e.g., driver preferences for vehicle operation facets) or a passenger zone, (iv) seat-specific preferences when the mobile computing device is provided in an occupancy zone corresponding to a specific seat, and/or (v) restrictions 131 that restrict operation or use of the vehicle.

Figure 2:
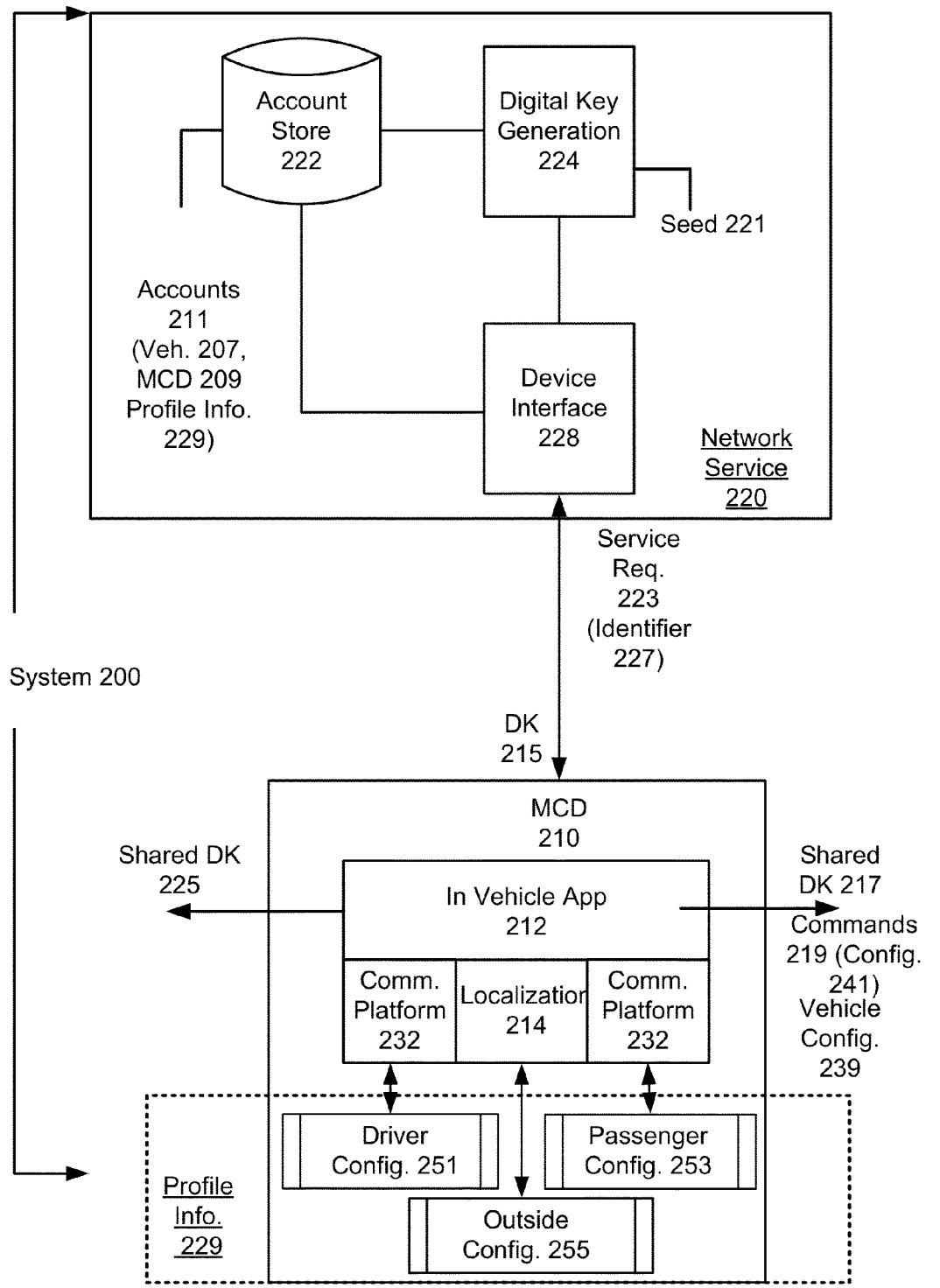
FIG. 2 illustrates a system for enabling a mobile computing device to control a vehicle, according to one or more embodiments.

FIG. 2 illustrates a system for enabling a mobile computing device to control a vehicle. In an example of FIG. 2, system 200 includes a key service in the form of a network service 220 (which can be provided by one or more servers), and a mobile computing device 210. The mobile computing device 210 can correspond to a multi-functional wireless (e.g., cellular) telephony/messaging device, such as a smart phone, having an operating system on which one or more applications can be executed. In example of FIG. 2, the mobile computing device 210 includes, for example, a vehicle control application 212, which can be downloaded from a network site. The vehicle control application 212 can include functionality described with the application of 108, including, for example, generating exchanged digital keys and implementing proximity pairing with a particular vehicle. Generally, the network service 220 provides the mobile computing device 210 with a digital key 215 for controlling and/or operating a vehicle 20 (see FIG. 1).

In one example, the network service 220 includes an account store 222, a digital key generation component 224, and a device interface 228. The digital key generation component 224 can operate to generate the digital key 215 for the mobile computing device 210 based on a seed input 221. The seed input 221 can be random, or alternatively based on information about the mobile computing device 210 (or its users), and/or the vehicle that is to be operated or controlled by the digital key 215. In response to, for example, a service request 223 (e.g., user can request digital key from service 220), the digital key generation component 224 can generate the digital key 215 and associate the digital key with a particular account 211. Each account 211 can identify a vehicle 207, as well as a user and/or an identifier 209 of the corresponding mobile computing device.

Initially, the mobile computing device 210 can be operated to request the digital key 215 from the network service 220. The device interface 228 can interact with the mobile computing device 210 in receiving the service request 223. From the service request 223, the device interface 228 can determine an identifier 227 of the mobile computing device 210. In one implementation, the identifier 227 can trigger the digital key generation component 224 to generate the digital key 215. The digital key 215 and identifier 227 can be stored in the account store 222 in association with a particular account 211. Additionally, the device interface 228 can use the identifier 227 from the mobile computing device 210 to retrieve the digital key 215 from the account store 222, and to communicate the digital key to the mobile computing device 210.

The account store 222 can also associate each digital key 215 with a profile information 229, and the profile information 229 can be associated with control parameters that regulate the use of an account or of a particular digital key 215 associated with the account. As an addition or alternative, the profile information 229 can be stored on the mobile computing device 210 for use with another device that receives an exchanged digital key. In this way, the profile information 229 can define specific actions or preferences of a given digital key 215 received from either the network service 220 or generated from another mobile computing device. Among other aspects, the profile information 229 can specify one or more of the following: (i) whether the user is to be provided access to the main cabin of the vehicle; (ii) whether the user is to be provided access to the trunk of the vehicle; (iii) whether the user is to be provided access to glove department of the vehicle; (iv) whether the user is permitted to drive the vehicle; (v) whether the user can retrieve diagnostic information from the vehicle; (vi) the maximum speed that the car can be driven for a given user; (vii) time of day and duration limitation for when the vehicle can be used or accessed; (viii) geofencing limitations that preclude operation of the vehicle (e.g., preclude vehicle from leaving a set range).

The mobile computing device 210 can operate a vehicle control application 212 for communicating with the network service 220, and for receiving and utilizing the digital key 215. The vehicle control application 212 can receive the digital key 215 from the network service 220 and further store the digital key 215 in local memory. In some embodiments, the vehicle control application 212 can also implement functionality for extracting and/or generating an exchanged digital key 217 from the digital key 215. The vehicle control application 212 can also include functionality for communicating the exchanged digital key 217 to the vehicle as needed. Additionally, the vehicle control application 212 can include functionality for implementing authentication of the user (e.g., require user to periodically login, biometric authentication), and/or functionality for determining when the digital key 215 can be used with respect to the vehicle. For example, the vehicle control application 212 can operate to require proximity conditions to be present when the digital key 215 is communicated or otherwise used for certain purposes.

The proximity conditions for pairing the mobile computing device 210 with the vehicle can be either the same or different than the proximity conditions for enabling the mobile computing device 210 to issue commands 219 to the vehicle. For example, in one implementation, both pairing and command issuance can be achieved if the mobile computing device 210 can communicate with the vehicle using, for example, one of a Bluetooth, DSRC, or Wi-Fi medium. In a variation, at least some commands 219 may require additional conditions. For example, the command to start the vehicle may require a proximity condition in which the mobile computing device 210 is inside the vehicle. As still another variation, some commands, such as the command to start the vehicle, may require localization conditions within the vehicle. For example, the vehicle may start once certain localization conditions or satisfied, such as, for example, the mobile computing device being positioned in a safe place relative to the driver so as to not be distracting.

Additional localization conditions can also be implemented to mitigate the possibility of driver distraction. By way of example, if localization conditions indicate the driver is within the vehicle, the operational mode of the mobile computing device 150 can change to reflect a possible driver environment. For example, the graphics of the mobile computing device 210 can be simplified and/or enlarged, and/or the mobile computing device 210 can be made receptive to voice input. As another example, some or all of the user interface features of the mobile computing device can be transferred to a vehicle display unit.

The vehicle control application 212 can also include a user interface for providing the user with prompts to enter commands. Additionally, the vehicle control application 212 can provide information to the user, such as information about the state of the vehicle (e.g., the vehicle is locked).

According to another aspect, the vehicle control application 212 can also operate in conjunction with a localization functionality 214. The localization functionality 214 can be provided as a combination of programmatic and hardware resources. In one implementation, the localization functionality can be provided in part with the vehicle control application 212. Alternatively, the localization functionality 214 can be provided in part as a plug-in or as integral functionality with respect to the vehicle control application 212. The programmatic components of the localization functionality 214 can control the use of, for example, localization determination resources (e.g., "LDR 360" of FIG. 3A, "LDR 374" of FIG. 3B), which can include (i) hardware for transmitting signals (e.g., ultrasound, acoustic), and/or (ii) resources for making localization determinations from signal analysis (range determination, triangulation, etc.). In this way, the localization functionality 214 can include functionality in which the relative position of the mobile computing device 210 within or outside of the vehicle can be determined. For example, localization determinations can be made that identify an occupancy zone of the mobile computing device, such as whether the mobile computing device 210 is within the reach of the person sitting at the wheel, or which seat in the vehicle the mobile computing device 210 is near once the vehicle starts.

In some implementations, the localization functionality 214 includes hardware resources for determining the relative location of the mobile computing device 210 within or outside of the vehicle. For example, the localization functionality 214 can utilize hardware resources such as a microphone/speaker or acoustic transmitter/receiver to determine a range of the mobile computing device with respect to a reference point within the vehicle (e.g., steering wheel). As an alternative or variation, the localization functionality 214 can include antenna elements and programmatic functionality for performing triangulation based on a transmitted signal from the mobile computing device 210. The accuracy of the local position of the mobile computing device 210 can be, for example, within 25 cm, and in some variations, within 10 cm of the actual location of the device.

More generally, the mobile computing device 210 localization functionality 214 provides resources and logic for determining its position relative to the vehicle. The resources of localization functionality can, depending on implementation, include (i) sensors, such as an accelerometer or gyroscope on the mobile computing device 210, (ii) communication resources for communicating with other devices within a vehicle, including one or more short-range wireless communication ports and a programmatic application platform for enabling communications amongst devices within a vehicle (e.g., through use of peer-to-peer communications), (iii) logic for determining the device's location relative to the vehicle based on sensor information and/or communication exchanges with other mobile computing devices or components within the vehicle.

The vehicle application 212 can communicate commands 219 that also specify desired vehicle configurations 241. The vehicle configurations 241 based on (i) profile information stored on the mobile computing device 210 for the user and/or with the digital key 215, and (ii) the determinations of the localization functionality 214. The vehicle configurations 241 can be based on profile information 229 stored on the mobile computing device 210. The profile information 229 can, for example, include driver profile information 251 (e.g., information for determining configurations when a user of the mobile computing device 210 is determined to be the driver), passenger profile information (e.g., information for determining configurations when a user of the mobile computing device 210 is determined to be a passenger), and/or outside parameters 255 (e.g., information for determining configurations (e.g., pre-entry configurations) when a user of the mobile computing device 210 is outside of the vehicle.

Thus, according to some embodiments, the localization functionality 214 of the mobile computing device 210 can include outside/inside determination resources and logic for determining whether the mobile computing device 210 is outside or inside a vehicle. As described with other examples, when the mobile computing device 210 is outside of the vehicle, the mobile computing device 210 can implement some configurations 241 on the vehicle using stored profile data 239 (e.g., outside configurations 255), in order to configure one or more operational or usage facets of the vehicle prior to the mobile computing device entering the vehicle. Within the vehicle, the mobile computing device 210 can include logic and resources for determining whether the mobile computing device is likely in the possession of a driver (e.g., with the driver seat or in the driver zone), in the possession of a passenger, or elsewhere in the vehicle (e.g., trunk). Stored profile data 239, including driver and passenger configuration parameters 251, 253 can be used to implement configurations 241 based on such determinations.

Still further, mobile computing device 210 can include resources and logic for determining more granular localization information. On the exterior of the vehicle, the localization determination can be specific as to whether the mobile computing device 210 is entering a vehicle on the driver or passenger side, and/or front row or back. On the interior of the vehicle, the localization determination can be specific as to occupancy zones, which can be defined by seat row or region.

Still further, the localization determination can be specific to a particular seat. According to some embodiments, the mobile computing device 210 includes resources and logic in the form of motion sensors (e.g., accelerometers, gyroscope's) and logic for determining a specific seat position of the mobile computing device.

In some embodiments, the vehicle control application 212 can trigger or otherwise control implementation of vehicle configurations 239 that affect operational or usage facets of the vehicle. The selection of vehicle configurations 239 can be based in part on profile information 241 stored on the mobile computing device 210. The stored profile information 241 can, for example be affixed to the digital key 215 and/or provided with encrypted communications generated from the mobile computing device 210 for the vehicle. In some embodiments, the mobile computing device 210 automatically selects profile information for implementing configurations 239 on the vehicle, and further automatically communicates the selected profile information through the vehicle application 212 to the vehicle. In one implementation, the vehicle application 212 selects configurations for communication to, for example, the controller 370 (see FIG. 3B) of the vehicle based on the mobile computing device's determination of its relative position with respect to the vehicle (e.g., inside versus outside; occupancy zone inside; specific seat location inside). The operational facets that can be configured include, for example, by profile information associated with the particular digital key 215 include selection of the driving mode of the vehicle. Similarly, the usage facets that can be configured by profile information of the mobile computing device 210 include, for example, seat position, steering wheel position, media center selections and/or settings, interior lighting, exterior lighting, seat temperature, air temperature, rear view mirror setting, streaming content selection for output on media output device of vehicle, etc.).

Still further, in additional variations, the vehicle control application 212 can control functionality of the mobile computing device 210 based on determinations of the localization functionality 214 in connection with the seat of the vehicle where the mobile computing device 210 is located. For example, certain functions of the mobile computing device can be disabled if the determination of the localization functionality 214 is that the mobile computing device 210 is with the driver of the vehicle when the vehicle is being operated.

In variations, the network service 220 can implement controls on the use of the digital key 215 in accessing a particular vehicle. For example, control parameters can be associated with an account 211 and/or digital key 215. The control parameters can trigger the network service 220 to perform actions that regulate the use of the digital key 215. Alternatively, the control parameters can trigger the mobile computing device 210 to perform actions that regulate the use of the digital key 215. For example, the control parameters can regulate a life span of the token, or alternatively, durations during which time the digital key 215 is operative. For example, the digital key 215 can be generated to have a life that is of a set duration (e.g., few days to years).

The control parameters can also control whether the digital key 215 can be utilized to generate additional digital keys for other devices. For example, a particular user of a vehicle can have authority to generate multiple exchanged digital keys for use with the vehicle, but recipients of exchanged digital keys can be precluded from generating additional exchanged digital keys.

As described with an example of FIG. 1, a user of the mobile computing device 210 can generate an exchanged digital key 225 from the digital key 215 provided by the network service 220. The mobile computing device 210 can communicate the exchanged digital key 225 to another mobile computing device. For example, the vehicle control application 212 can be used to generate exchanged digital keys 225, and to communicate exchanged digital keys 225 to other devices. The user can also specify restrictions that can be attached as encrypted data elements to the exchanged digital key 225, including, for example, a duration when the shared digital key 225 is valid.

In a variation, the network service 220 can generate and communicate multiple keys 215 for a select vehicle. For example, multiple keys can be generated at the request of a user, and communicated to multiple devices as identified by the original user. The network service 220 can include, for example, one or more user interfaces from which the user can specify mobile computing devices that are to receive digital keys 215 for the select vehicle.

In some variations, the vehicle control application 212 can operate to associate profiles with exchanged digital keys 225 that are shared with other users. For example, the user of mobile computing device 210 can operate the vehicle control application 212 to set a profile for an exchanged digital key 225 that is to be shared with another user. The profile for the exchanged digital key 225 can further specify control parameters relating to the use of the exchanged digital key 225 and the corresponding vehicle.

While some examples, such as described with FIG. 2, illustrate use of network service 220 to maintain user accounts 211 and user information, other variations can provide for such information to be maintained on a user device (e.g., mobile computing device 210). For example, functionality described in an example of FIG. 2 as being maintained by the network server 120 for a particular user account (e.g., user preferences, etc.) can alternatively be implemented to be maintained on a user device (e.g., mobile computing device 210).

Figure 3A:
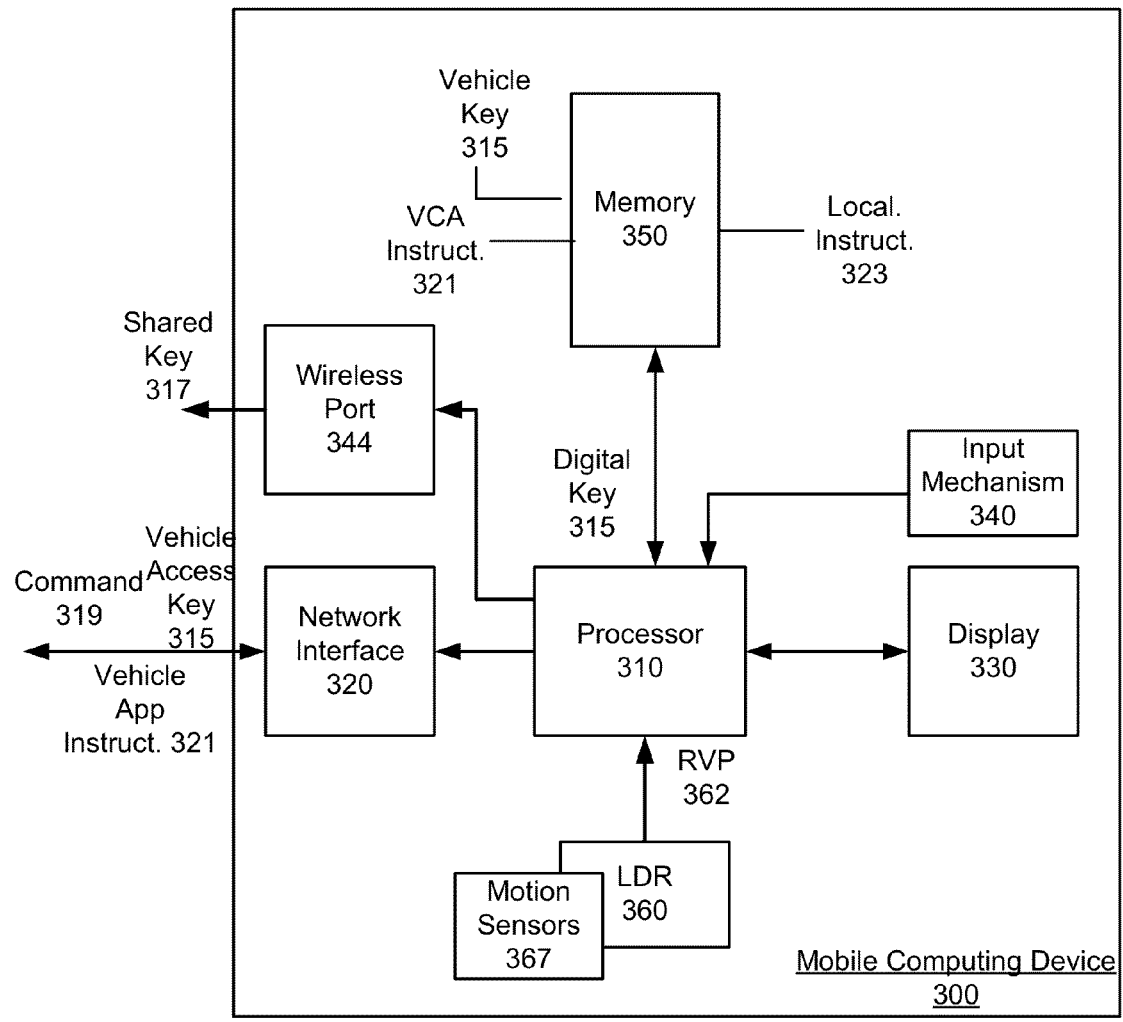
FIG. 3A illustrates an example of a mobile computing device, according to one or more embodiments.

FIG. 3A illustrates an example of a mobile computing device, according to one or more embodiments. A mobile computing device 300 can include a processor 310, a network interface 320, a display 330, one or more input mechanisms 340, a local communication port 344, and a memory 350. The processor 310 can utilize the network interface 320 to communicate with a network service 220 (see FIG. 2). The processor 310 can communicate with the network service 220 (or with another network site) to receive an instruction set 321 ("vehicle control application instruction set 321") for implementing the vehicle control application 212 (see FIG. 2). The vehicle control application instruction set 321 can be stored in the memory 350.

The processor 310 can also use the vehicle control application instruction set 321 to communicate information to the network service 220 that identifies, for example, a vehicle or user. The processor 310 can further receive from the network service 220 a digital key 315, and further store the digital key 315 in the memory 350 in encrypted form. In some implementations, the processor 310 executes instructions from the vehicle control application instruction set 321 and uses the digital key 315 to perform a pairing operation with a vehicle using the local communication port 344. The pairing operation can correspond to the processor 310 generating an exchanged digital key 317 from the digital key 315, and then communicating the exchanged digital key 317 to the selected vehicle using the local communication port 344. By way of example, the local communication port 344 can correspond to a Bluetooth port, a Wi-Fi port, a Near Field Communication (NFC) port, or another form of short-range (e.g., less than 30 meter diameter) wireless communication medium. As an alternative or variation, the initial pairing operation can be performed though a wired connection. For example, the processor 310 can signal data for pairing through a physical USB port.

In addition to performing the pairing operation, the processor 310 can use the vehicle control application instruction set 321 to authenticate the mobile computing device 300 when the mobile computing device is in sufficient proximity to the vehicle. The authentication can unlock the vehicle, and further enable the vehicle to process commands 319 from the mobile computing device as communicated over the local communication port 344. In variations, the processor 310 can encrypt commands 319 for operating the vehicle (e.g., "open" or "start") using the vehicle digital key 315. The vehicle can in turn decrypt the commands 319 using the exchanged digital key 317.

In some variations the mobile computing device 300 includes location determination resources 360 ("LDR 360") that provide input for processor 310 in order to determine a relative vehicle location ("RVP") 362 of the mobile computing device with respect to a paired vehicle. The LDR 360 of the mobile computing device 300 can operate as stand-alone functionality, or as a system in combination with a corresponding set of location determination resources of the vehicle (see LDR 374 of FIG. 3B). In one implementation, the LDR 360 includes one or more receivers that receive transmission signals from corresponding transmitters of the LDR 374 (see FIG. 3B) of the vehicle. The received signals can correspond to, for example, acoustic signals and/or radio-frequency signals. The LDR 360 can receive transmissions from the resources (e.g., LDR 374 of FIG. 3B) of the vehicle in order to determine the RVP 362. The RVP 362 can correspond to a range value (e.g., distance from steering wheel) or location value (e.g., zone). The processor 310 can execute instructions for implementing programmatic processes of localization functionality 214 ("localization instructions 323"). In variations, the RVP 362 as determined from the LDR 360 of the mobile computing device 300 can correspond to one or more of the following: (i) a determination that the mobile computing device 300 is outside of the vehicle and within the range of the driver seat; (ii) a determination that the mobile computing device is most likely in one of the passenger seats; (iii) a determination that the mobile computing device is not within the operating range of the driver's position (i.e., driver is not likely using the device); and/or (iv) a determination that the mobile computing device is within a specific non-passenger location (e.g., glove box, trunk, etc.). The LDR 360 can be implemented using dedicated hardware resources, and/or firmware resources integrated with existing components.

In one implementation, the LDR 360 can include digital ultrasound positioning components, such as manufactured by Qualcomm Inc. In such an implementation, the LDR 374 of the vehicle can include, for example, an ultrasound transmitter, and the mobile computing device 300 can include or otherwise be provided with a receiver and software to determine range location based on the transmission signal.

Still further, in some embodiments, the mobile computing device 300 includes motion sensors 367 (e.g., accelerometer, gyroscope) for determining seat position in conjunction with vehicle resources, such as seat sensors and/or sensor event generators. In some embodiments, localization functionality 214 (FIG. 2) can be implemented to determine a seat position of the mobile computing device within the vehicle, using a motion sensors 367, programmatic resources and sensory output/input resources of the vehicle.

In some embodiments, the processor 310 implements functionality to control or otherwise operate the paired vehicle and/or mobile computing device 300 using the RVP 362. For example, if the mobile computing device 300 is in the driver seat, the processor 310 can automate functionality for locating the headset or car speaker for the mobile computing device 300. As another example, the mobile computing device 300 can initiate sharing of functionality with the vehicle to display, for example, a navigation screen.

As an addition or alternative, the processor 310 can further implement functionality to control the operation of the mobile computing device 300 based on the RVP 362. For example, the processor 310 can limit functionality of the mobile computing device 300 in response to determining that the device is in sufficient proximity to the driver seat that is likely in use by the driver. For example, the processor 310 can limit the operation of the input mechanism (e.g., preclude entry of text input), or preclude phone calls that are not made through a headset.

As an addition or alternative, the processor 310 can further utilize integral components of the mobile computing device 300 to implement functionality for tracking telemetric information of the vehicle when the digital key 315 is used to operate or access the vehicle. For example, resources such as Global Positioning System (GPS) components of the mobile computing device 300 can be used to determine velocity and/or path of the vehicle. Likewise, an accelerometer of the mobile computing device 300 can be used to determine information such as acceleration or stopping force.

Figure 3B:
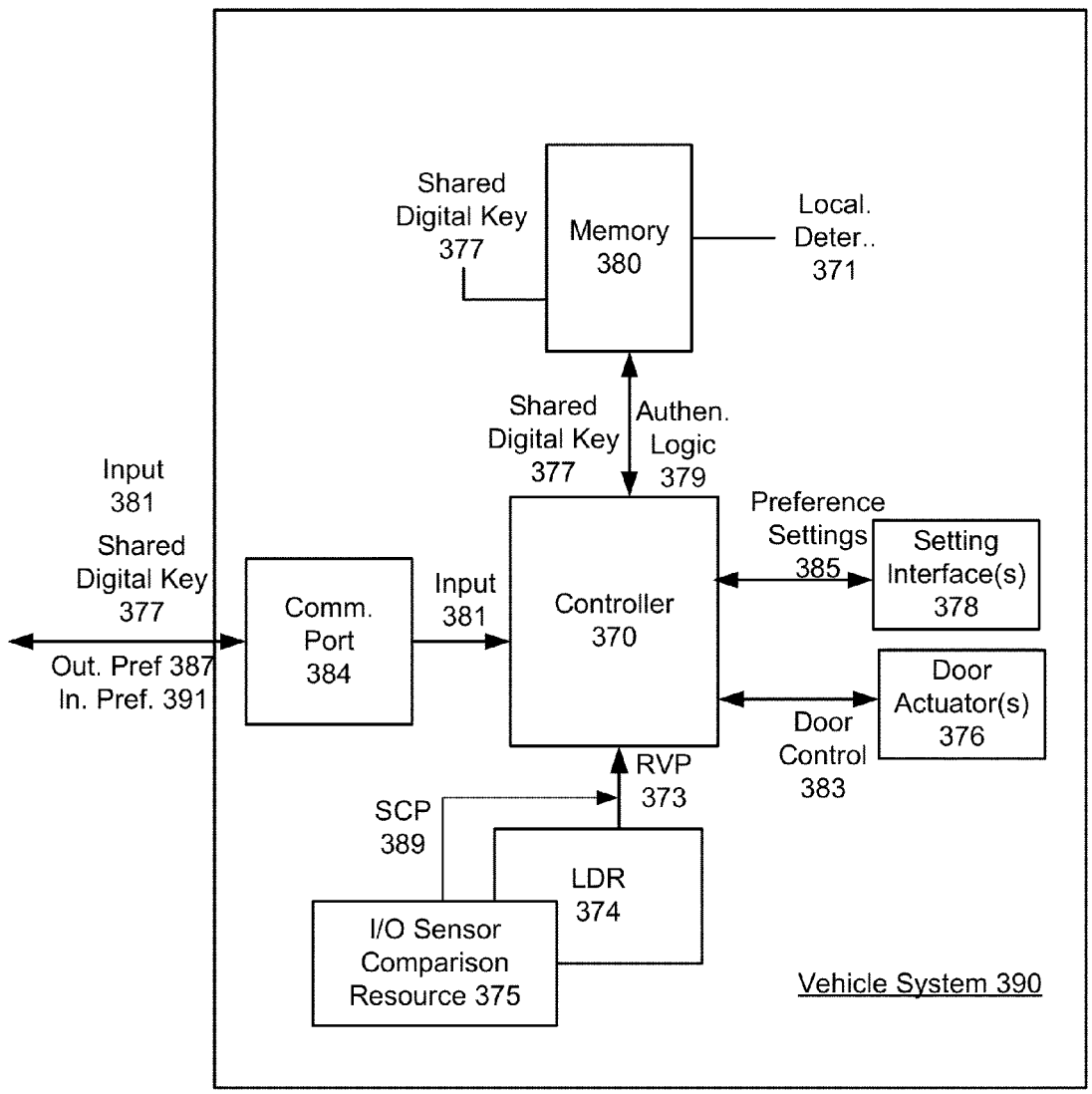
FIG. 3B illustrates an example of a vehicle system, according to one or more embodiments.

FIG. 3B illustrates an example of a vehicle system for using a digital key to authenticate and provide access to a corresponding vehicle, according to an embodiment. A vehicle system 390 such as described with an example of FIG. 3B can be implemented in a corresponding vehicle that can be paired with a mobile computing device to enable digital key exchange and use. In describing an example of FIG. 3B, reference may be made to components described with an example of FIG. 3A for purpose of context and example.

The vehicle system 390 includes a controller 370, memory resources 380, a local communication port 382, and one or more actuators 376. Additionally, in some embodiments, the vehicular system 390 includes location determination resources ("LDR 374") that locate the mobile computing device 300 within the vehicle.

By way of example, the local communication port 384 can correspond to a Bluetooth port, a Wi-Fi port, a Near Field Communication (NFC) port, or another form of short-range (e.g., less than 30 meter diameter) wireless communication medium. During the pairing process, the local communication port 384 can receive the exchanged digital key 377 from the mobile computing device 300. The processor 370 can store the exchanged digital key 377 with the memory resources 380. Subsequently, the mobile computing device 300 can signal input 381, which is received by the vehicle system 390 over the local communication port 384. The controller 370 can execute authentication logic 379 to authenticate that the input 381 originates from the mobile computing device 300 (from which the exchanged digital key 377 originated).

Additionally, in some variations, the controller 370 can interpret the input 381 (e.g., open door, turn ignition, etc.). More specifically, in response to receiving the input 381 over the communication port 384, the controller 370 can signal control 375 to one or more corresponding actuators 376. For example, the controller 370 trigger a first actuator 376 to unlock door(s), and/or a second actuator 376 to switch the engine ignition.

In addition to signaling input 381, the mobile computing device can signal preferences. As described with other examples, preferences can include outside preferences 387 and/or inside preferences 391. As described with other examples, at least one of the mobile computing device and/or vehicle can include resources for determining whether the mobile computing devices inside or outside of the vehicle. For example, as described with some embodiments, mobile computing device can associate different preferences 387 (outside), 391 (inside) depending on whether the mobile computing device is outside or inside the vehicle. The mobile computing device can also specify different preferences based on a location of the mobile computing device within the vehicle (e.g., by seat position).

The vehicle system 390 can also include a set of interfaces to various operational are usage facets of the vehicle 390. The operational facets can include a motor setting affecting the operation of the vehicle, such as the driving style mode selected by the user (e.g., valet setting, fuel conservation setting, sport setting, etc.). The usage facets can include, for example, seat position, steering will position, entertainment module settings, selection of media output content provided on display screens, lighting, see temperature, environmental conditions such as temperature, etc. The controller 370 can implement configurations 385 through the various interfaces 378 based on preferences 387 (outside), 391 (inside) signaled by the mobile computing device.

In some embodiments, the vehicle system 390 includes LDR 374 to locate the mobile computing device 300 within the vehicle. In one implementation, the LDR 374 determines a range of the mobile computing device 300 within the vehicle. In a variation, the mobile computing device 300 determines an approximate location of the mobile computing device 300 within a particular region or zone of the vehicle (e.g., driver seat, passenger seat). In one implementation, the LDR 374 includes multiple (e.g., two or more) receivers that receive transmissions from the mobile computing device 300.

In a variation, the mobile computing device 300 can include an acoustic transmitter, and the processor 370 of the vehicle system 390 includes location determination instructions 371 for implementing an algorithm for triangulating an echo or return signal from the acoustic transmitter of the mobile computing device 300. The triangulation can identify a position of the mobile computing device 300 relative to a reference within the vehicle.

The LDR 374 of the vehicle system 390 can operate as stand-alone functionality, or as a system in combination with the LDR 360 of the mobile computing device. In one implementation, the LDR 374 includes one or more receivers that receive transmission signals from corresponding transmitters of the mobile computing device 300. The received signals can correspond to, for example, acoustic signals or radio-frequency signals. The LDR 374 can receive transmissions from the resources (e.g., LDR 360 of FIG. 3A) of the mobile computing device 300 in order to determine the RVP 373. The RVP 373 can correspond to a range value (e.g., distance from steering wheel) or location value (e.g., zone). In variations, the RVP 373 as determined from the LDR 374 of the vehicle system 390 can correspond to one or more of the following: (i) a determination that the mobile computing device 300 is within the range of the driver seat; (ii) a determination that the mobile computing device is most likely in one of the passenger seats; (iii) a determination that the mobile computing device is not within the operating range of the driver's position (i.e., driver is not likely using the device); and/or (iv) a determination that the mobile computing device is within a specific non-passenger location (e.g., glove box, trunk, etc.). The LDR 374 can be implemented using dedicated hardware resources, and/or firmware resources integrated with existing components of the vehicle.

In one implementation, the LDR 374 can include digital ultrasound positioning components, such as manufactured by Qualcomm Inc. In such an implementation, the LDR 360 of the mobile computing device 300 can include, for example, an ultrasound transmitter, and the vehicle system 390 can include or otherwise be provided with a receiver and software to determine range location based on the transmission signal.

Still further, in some embodiments, the vehicle system 390 includes sensor input or output resources 375, which can operate to provide a sensor comparison profile 389 from one or more locations within the vehicle. The resources 375 can be positioned or associated with individual seats of the vehicle in order to generate sensor comparison profile 389 that can enable seat positions. As described with other examples, the sensor comparison profile 389 can be used as a basis for determining a seat position of a mobile computing device within the vehicle. For example, the sensor comparison profile 389 can be used to implement sensor correlation logic (e.g., read seat sensor values in connection with seating events) and/or position determination logic (e.g., generate timed sensor-detectable event) in connection with a sensor profile output of a mobile computing device within the vehicle.

In some embodiments, the processor 370 of the vehicle system 390 implements functionality to control or otherwise operate the vehicle using the RVP 373. For example, if the mobile computing device 300 is in the driver seat, the processor 370 can automate functionality for locating the headset or car speaker, and initiate communications with the mobile computing device for purpose of pairing the mobile computing device 300 with the audio equipment.

As an addition or alternative, the processor 370 of the vehicle system 390 can further implement functionality to control the operation of the actuators 376 and/or vehicle based on the RVP 373. For example, the processor 370 can limit operation of the vehicle or components of the vehicle (e.g., navigation equipment) in response to determining that the device is in sufficient proximity to the driver seat that is likely in use by the driver.

With reference to FIG. 3A and FIG. 3B, another ranging technique that can be employed includes (i) transmitting simultaneous pulses in both acoustic and radio-frequency mediums, and (ii) measuring a delay in reception of the audio signal in comparison to the radio-frequency signal. In one implementation, the transmitting can be done by one of the LDR 360 (of the mobile computing device 300) or LDR 374 (of the vehicle 390), and the measuring/reception can be performed by the other of the LDR 360, 374 respectively. In a variation, the LDR 360 (of the mobile computing device 300) or LDR 374 (of the vehicle 390) can generate the pulse and then determine the differential between the return signal from each of the pulses. As a transmitter, each LDR 360 or 374 can include a set of acoustic transmitters that are coupled to a set of radio-frequency transmitters. Likewise, as receivers, each LDR 360 or 374 can include a set of acoustic receivers that are coupled to a set of radio-frequency receivers. In either implementation, the differential between the two signals can be mapped to a distance that corresponds to the range. In implementation, for example, three sets of transmitters and receivers can be employed between the LDR 360 and LDR 374 in order to determine the differential between the two types of signals.

Figure 4:
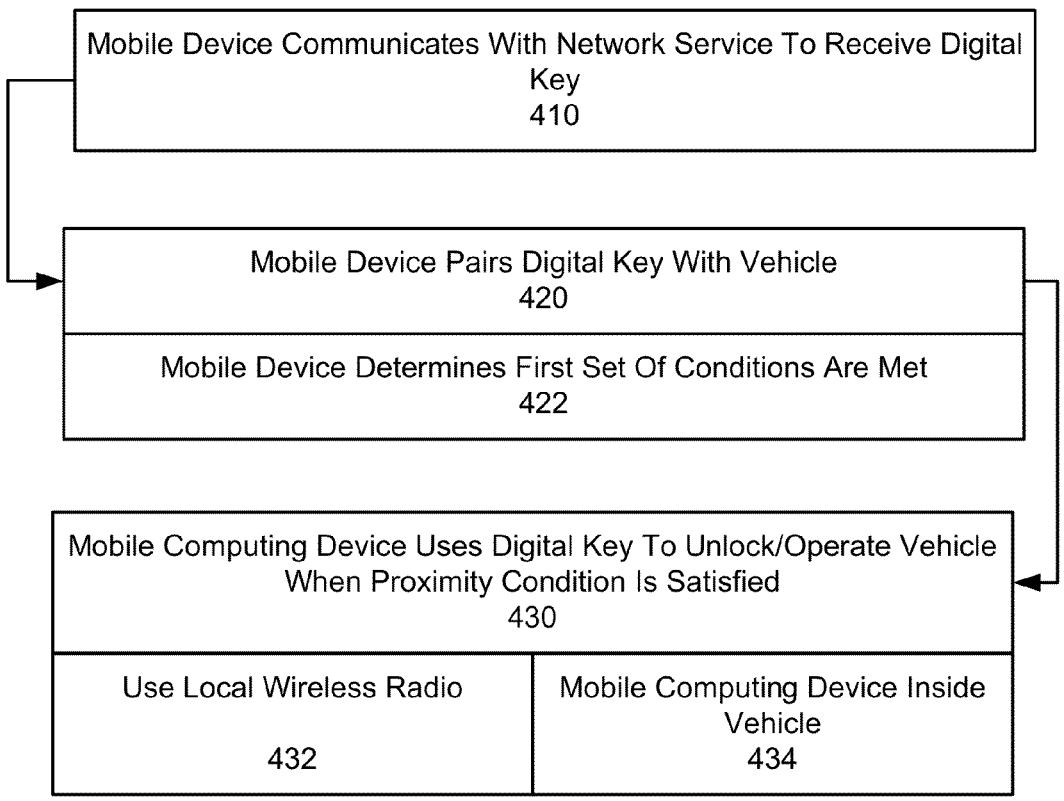
FIG. 4 illustrates an example method for utilizing a mobile computing device as a digital key to access or operate a vehicle, according to one or more embodiments.
Figure 5:
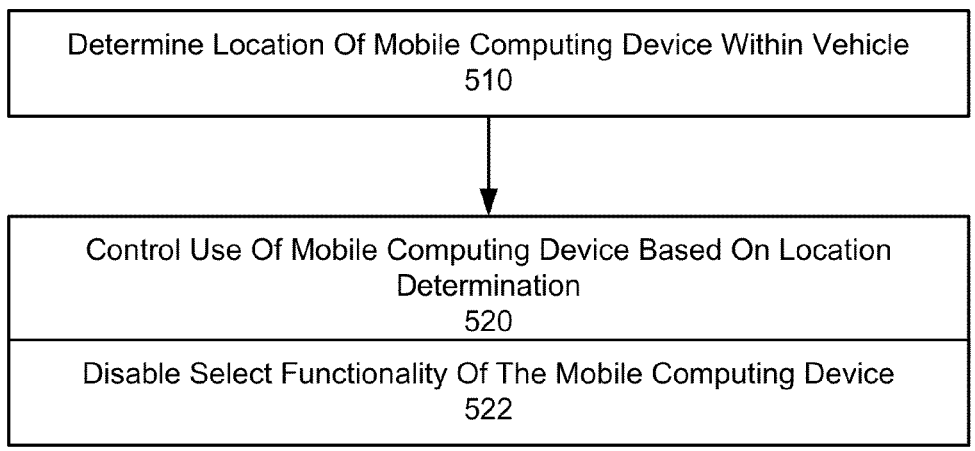
FIG. 5 illustrates an example method for controlling a mobile computing device based on a relative position of the mobile computing device within a vehicle, according to one or more embodiments.

FIG. 4 illustrates an example method for utilizing mobile computing device as a digital key to access or operate a vehicle. FIG. 5 illustrates an example method for controlling a mobile computing device based on a relative position of the mobile computing device within a vehicle. Examples such as described with FIG. 4 and FIG. 5 can be implemented using components or elements referenced with examples of FIG. 2 or FIG. 3A. Accordingly, reference may be made to elements of FIG. 2 or FIG. 3A for purpose of illustrating suitable components for performing a step or sub-step being described.

With reference to FIG. 4, mobile computing device 210 communicates with network service 220 to receive the digital key 215 for operating a vehicle (410). In one implementation, the mobile computing device 210 can correspond to, for example, cellular-telephony/messaging device, such as a smart phone or feature phone. The mobile computing device 210 can include an application that is programmed to communicate with the network service 220. For example, the mobile computing device 210 can download an application from an applications store in order to communicate with and receive services from the network service 220.

Once the mobile computing device 210 is provided the digital key 215 from the network service, the mobile computing device can be brought into proximity with a chosen vehicle in order to pair the mobile computing device with the vehicle (420). In one implementation, the digital key 215, as provided by the network service 220, can be used to communicate an exchanged digital key 217 to the vehicle. In the pairing process, the mobile computing device 210 communicates the exchanged digital key 217 to the vehicle. The communication of the exchanged digital key 217 can be a onetime event. The vehicle can include programmatic components for communicating with the mobile computing device 210, including a receiver to receive the exchanged digital key 217. However, the vehicle does not require independent network access in order to receive the exchanged digital key 217. Rather, the vehicle can receive the exchanged digital key 217 from the mobile computing device 210.

According to one aspect, a first set of conditions are required to be satisfied in order for the pairing process to be permitted (422). In one implementation, the mobile computing device 210 determines whether the conditions are present in order for pairing to be enabled. The first of conditions can include a determination that proximity conditions are met in order to enable pairing. The proximity conditions can include a determination by the mobile computing device 210 that the vehicle is within range of a short-range wireless radio (e.g., Bluetooth, NFC)) of the mobile computing device. As a variation, the proximity condition can incorporate a determination of signal strength from the short-range wireless signal provided form the mobile computing device 210. In variations, the mobile computing device 210 may determine its location to be adjacent to the vehicle (e.g., using near-field sensors). In variations, multiple wireless mediums can be used to determine the range of the mobile computing device 210 from the vehicle, with different mediums providing varying degrees of accuracy. For example, Wi-Fi signals from the mobile computing device 210 can be utilized in order to determine when the mobile computing device 210 is within a longer range (e.g., less than 10 m) from the vehicle, and Bluetooth can be used to determine when the mobile computing device 210 is within a second shorter range (e.g., less than 1 m). Still further, NFC can be used to determine the mobile computing device 210 is adjacent (e.g., less than 10 cm) to the vehicle. As another variation, the condition for pairing may require proximity though a wired or physical connection (e.g., USB).

Other conditions that may be required in order for the pairing to be permitted include, for example, (i) a determination that the digital key 215 has not previously been shared with another vehicle, (ii) a determination that the mobile computing device 210 has not previously been provided a digital key for use with another vehicle, (iii) an identifier of the vehicle, and/or (iv) a location of the vehicle.

Once the pairing is complete, the mobile computing device 210 can subsequently communicate the digital key 215 to the vehicle in order to unlock and/or operate the vehicle (430). In order to communicate with the vehicle, the mobile computing device 210 can determine whether a second set of conditions are satisfied for transmitting a command to the vehicle. The second set of conditions can include, for example, a determination by the mobile computing device 210 that the vehicle is within range of a short-range wireless radio (e.g., Bluetooth) of the mobile computing device (432).

As an alternative or addition, the second set of conditions can also include a determination that the mobile computing device 210 is within the vehicle, or within a location of the vehicle (434). For example, mobile computing device 210 can transmit different commands to the vehicle using the digital key 215 based on satisfaction of different conditions. Thus, ability of the mobile computing device 210 to signal different commands can be based on the satisfaction of different conditions.

The mobile computing device can be operated to implement safety features for the vehicle. For example, the mobile computing device 210 can (i) advise the driver that phone calls and texting while driving is unsafe and/or against the law in the existing location; and/or (ii) restrict placing phone calls while the vehicle is in motion, but allow emergency calls while the vehicle is in motion.

With reference to FIG. 5, the location of the mobile computing device 210 can be determined within a vehicle (510). In particular, location of the mobile computing device 210 can be determined within or relative to the vehicle after either (i) pairing of the mobile computing device 210 with the vehicle, and/or (ii) the mobile computing device 210 signaling the digital key 215 to the vehicle. Within the vehicle, the location determination resource 360 of the mobile computing device 210 can determine, for example, one or more of the following: (i) a range of the mobile computing device 210 from a steering wheel or other reference point within the vehicle, (ii) the position of the mobile computing device 210 within the vehicle to within some tolerance X (e.g., ten centimeters), (iii) the seat closest that the mobile computing device 210 occupies or is closest to (e.g., where the user of the mobile computing device 210 is most likely located).

According to one aspect, the mobile computing device 210 is controlled based on a relative position of the mobile computing device within the vehicle (520). In particular, certain functionality can be limited or otherwise disabled based on the location of the mobile computing device 210 within the vehicle (522). For example, certain applications (e.g., messaging applications) or input mechanisms (e.g., keyboards) can be disabled based on the relative position of the mobile computing device 210 within the vehicle (e.g., mobile computing device 210 is within operational vicinity of the driver).

Figure 6A:
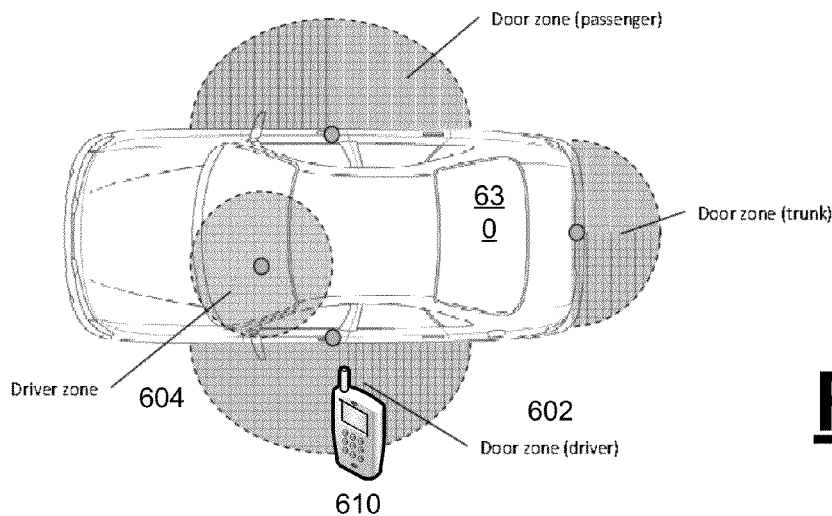
FIG. 6A illustrates an implementation for using localization determinations of a mobile computing device in relation to a vehicle, under an embodiment, according to one or more embodiments.

FIG. 6A illustrates an implementation for using localization determinations of a mobile computing device in relation to a vehicle, under an embodiment. According to some embodiments, a mobile computing device 610 can utilize LDR 360 (see FIG. 3A) in order to make localization determinations relative to a paired vehicle 630. In particular, with reference to an example of FIG. 6A, the mobile computing device can be located within the vehicle's vicinity (e.g., within 10 cm), within the vehicle, or within a given location within the vehicle. The localization determinations can be determined in conjunction with implementing functionality such as keyless lock/open for when mobile computing device is within few feet of the vehicle, as depicted by the door zones 602. When this is the case, for example, the driver can open or lock the vehicle doors by pressing a small button that is typically located on or next to the doors handle of the vehicle. Similarly, the location determinations can be determined in conjunction with other functionality such as engine start push button, corresponding to when mobile computing device 610 is within the vehicle, as shown by the zone 604. As an addition or alternative, the zone 604 can be provided substantially for the entire interior, for purpose of (i) enabling the engine of the vehicle to be started only when the mobile computing device 610 is within the zone, and/or (ii) precluding the vehicle from being locked unless the mobile computing device 610 is outside of the vehicle.

Among other benefits, localization determinations of the mobile computing device 610 can prevent against accidental locking of the mobile computing device 610 within the vehicle. For example, keyless push button for locking the vehicle can be disabled when the mobile computing device 610 is determined to be inside the vehicle.

In one embodiment, the security of vehicle 630 can further be enhanced with the use of an NFC communication medium. For example, the vehicle 630 can be equipped with an NFC pad on which the mobile computing device can be placed in order to exchange keys and commands. By requiring the mobile computing device to be placed on the NFC pad, an addition inherent self-authentication measure is provided, in that an authenticated digital key holder is required to be present at the vehicle.

In still another variation, the mobile computing device 610 and the vehicle 630 can include respective NFC ports to enable passive detection of the mobile computing device. In particular, the mobile computing device 610 can include a passive NFC port, which can be coupled to or brought into communication with an active NFC port on the vehicle 630. This configuration allows for the passive detection of the mobile computing device 610. The mobile computing device 610 can use the passive NFC port to transmit data elements generated through the use of the digital key, for purpose of unlocking the vehicle 630, and/or operating the engine ignition. Among other benefits, the use of NFC ports in this configuration enables the mobile computing device 610 to provide the digital key for the vehicle 630 even when the mobile computing device is inoperative (e.g., dead battery).

In still another variation, the vehicle 630 and/or mobile computing device 610 can implement video-recording and/or streaming. For example, the vehicle 630 can record video (e.g., driver) and stream the video to the mobile computing device 610 and/or network location. This feature can enable the user (and owner) of the vehicle to check the state of the vehicle when not in use, or to receive notification when the vehicle is in use by another person.

Figure 6B:
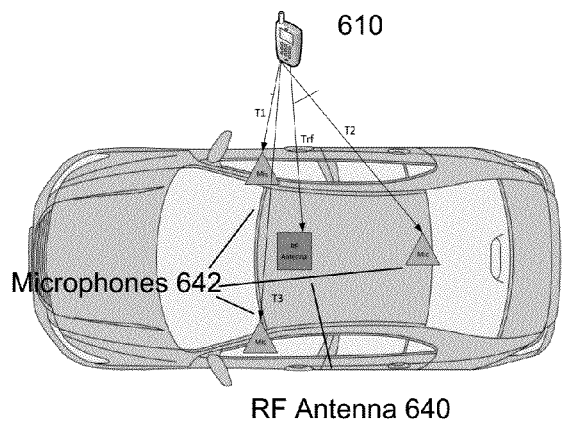
FIG. 6B illustrates an example for using localization determinations of a mobile computing device outside a vehicle, according to one or more embodiments.

FIG. 6B illustrates an example for using localization determinations of a mobile computing device in order to make a determination that the mobile computing device is outside of the vehicle. In an example of FIG. 6B, a mobile computing device 610 is depicted as being located outside of a vehicle 630. The vehicle 630 can be equipped with a radio frequency (RF) antenna 640 and multiple microphones 642 capable of detecting acoustic signals from outside the vehicle 630. In this example, the RF antenna 640 is positioned in a central location inside the vehicle 630, and the microphones 642 are positioned above the driver door, front passenger door, and near the back of the vehicle 630. Although three microphones 642 are depicted to be used for triangulation, more microphones 642 can be installed in other locations on the vehicle 630 to increase the precision and accuracy of localization determinations. Furthermore, the RF antenna 640 and some or all of the microphones 642 can be installed inside or outside of the vehicle 630 as long as they can detect sound waves originating from outside the vehicle 630.

In one aspect, the location of mobile computing device 610 is determined to be outside of the vehicle using triangulation of acoustic signals generated by the mobile computing device 610. In an example of FIG. 6B, this determination can be made by the vehicle, or alternatively information from the vehicle regarding the arrival times of the acoustic signal can be conveyed back to the mobile computing device. For example, the mobile computing device 610 can generate ultrasound transmissions beyond the range of human hearing that can be detected by the microphones 642 located on the vehicle 630. These transmissions can include a timestamp synchronized to an RF broadcast also sent by the mobile computing device 610 which is received by the RF antenna 640. In one aspect, the time elapsed between the transmission and reception of the RF broadcast is subtracted from the time elapsed between the ultrasound transmission and its reception at each of the microphones 642. By multiplying by the speed of sound, the distance of the mobile computing device 610 to each of the microphones 642 relative to the RF antenna 640 can be calculated. The position of the mobile computing device 610 can then be determined by triangulating the relative distances. In other examples, sounds at other frequencies can be used to determine the distance between the mobile computing device 610 and the microphones 642, such as sounds in the audible range of humans or infrasound.

In some aspects, the RF link between the mobile computing device 610 and RF antenna 640 also carries a digital key for authentication. For security reasons, the vehicle 630 may only activate features when the correct digital key is provided by the mobile computing device 610. This authentication, along with other security features, can be used to prevent unauthorized access to the vehicle 630.

Figure 6C:
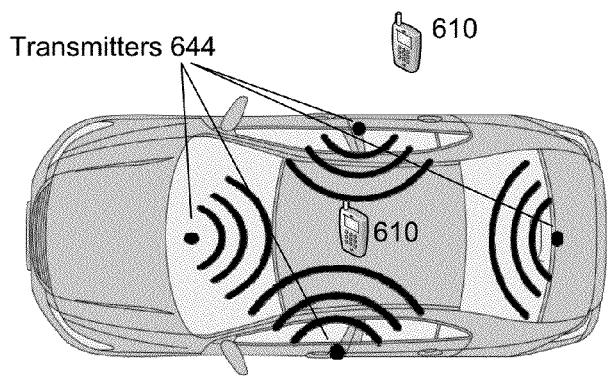
FIG. 6C illustrates an example for using signal strengths to determine the location of a mobile computing device relative to a vehicle, according to one or more embodiments.

FIG. 6C illustrates an example for using signal strengths to determine the location of a mobile computing device 610 relative to a vehicle 630, according to one or more embodiments. In an example of FIG. 6C, a vehicle 630 is equipped with multiple wireless transmitters 644 that can communicate with a mobile computing device 610 located either inside or outside of the vehicle 630. These transmitters 644 can utilize wireless technology standards such as Bluetooth or Bluetooth LE.

In some aspects, the location of the mobile computing device 610 can be determined based on the received signal strength indications (RSSI) from each of the wireless transmitters 644 located in the vehicle 630. RSSI is an indication of the power level being received by an antenna 640, such as one provided with the mobile computing device 610. Therefore, the higher the RSSI number, the stronger the signal.

In one example, relative RSSI values detected by the mobile computing device 610 can be used to determine whether the mobile computing device 610 is located inside or outside the vehicle 630. The mobile computing device 610 detects the multiple transmitters 644 and determines signal strengths for each transmitter. Since signal strength is a function of distance between the transmitter and receiver, the RSSI is lower when the mobile computing device 610 is further away from the transmitter. However, RSSI by itself is often not a reliable indicator of distance. To compensate for this limitation of RSSI, the RSSI from each of the transmitters 644 can be compared, and the differences between their RSSI values can be used to determine the location of the mobile computing device 610. More specifically, when the mobile computing device 610 is located within the vehicle 630, it is approximately the same distance from wireless transmitters 644 located around the perimeter of the vehicle 630, and therefore the RSSI values from each of the transmitters 644 are relatively similar. On the other hand, when the mobile computing device 610 is located outside of the vehicle 630, it is detectably further away from some of the transmitters 644 than others, and this difference can be detected in the RSSI values. For example, a user with a mobile computing device 610 standing outside the passenger side of the vehicle 630 may have a strong RSSI to the transmitter located on the passenger side but a weaker RSSI to the transmitter located on the driver side. Therefore, when the RSSI values detected by the mobile computing device 610 are significantly different, the mobile computing device 610 can determine that it is outside the vehicle 630 and perform functions accordingly.

Furthermore, the mobile computing device 610 can also determine on which side of the vehicle 630 (or front/back) it is located based on which transmitters 644 have higher RSSI values. In this aspect, the mobile computing device 610 knows the location of each transmitter, such as through a unique identification transmitted with the wireless signal. This unique identification can be correlated with data stored on the mobile computing device 610, such as a lookup table, or may be specially encoded so that the mobile computing device 610 can determine the transmitter's location based on the identification. Although FIG. 6C depicts four wireless transmitters 644, more can be used to improve the precision and accuracy of determining the location of the mobile computing device 610 relative to the vehicle 630, both outside or inside.

In some aspects, the wireless transmitters 644 can be set in a directional configuration. For example, the wireless transmitter at the front of the vehicle 630 may transmit its signal toward the rear of the vehicle 630 instead of in all directions. Through the use of directional transmitters 644, the location of the mobile computing device 610 can be determined based not only on the known positions of the transmitters 644 and their associated RSSI values, but also the direction in which the transmitters 644 are pointing. For example, a mobile computing device 610 on a user standing behind the vehicle 630 may detect a much stronger signal coming from the front transmitter than from the rear transmitter because the front transmitter is pointed towards the rear of the vehicle 630.

In addition, any of these implementations can be combined with the sound-based location techniques described with respect to FIG. 6B in order to further enhance the precision and accuracy of mobile communication device location determination.

Figure 7A:
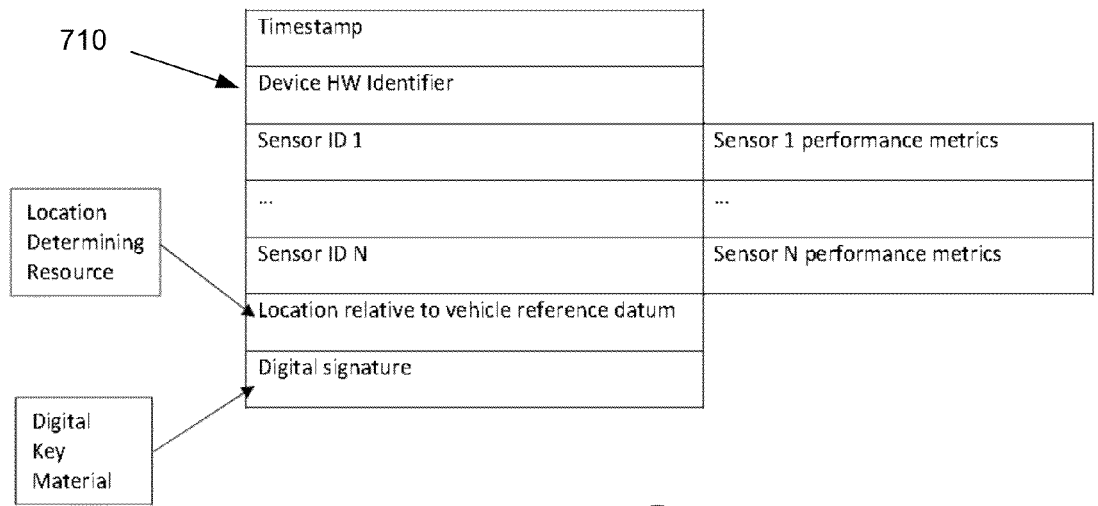

FIG. 7A through FIG. 7D illustrate examples of message structures for messages that can be sent by a mobile computing device to a vehicle in connection with use of a digital key to access the vehicle. In FIG. 7A, a message 710 that communicates the capabilities of the mobile computing device. The message 710 can include a time stamp, hardware identifier, sensor identifier, and a determined device location relative to the vehicle reference datum. The message 710 can convey a digital key. The message 710 provides an example of a communication exchanged when the mobile computing device establishes a digital key (or otherwise pairs) with a particular vehicle.

Figure 7B:
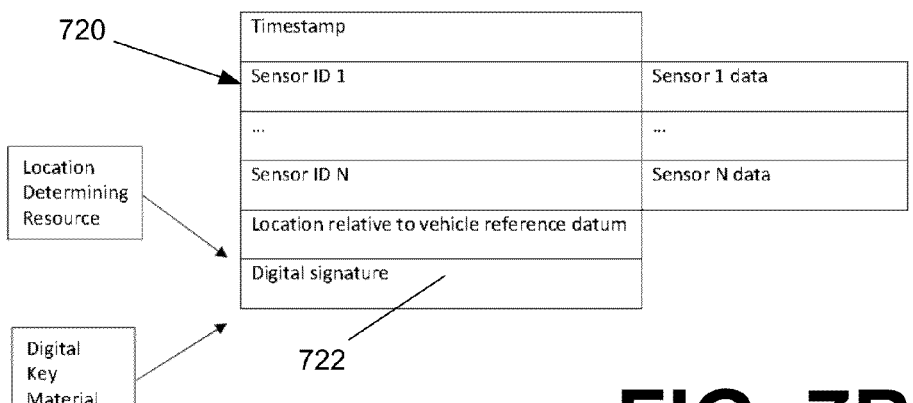

FIG. 7B illustrates an example of a message structure for unlocking a vehicle. A message 720 may be locked using the digital key, and the vehicle can use the exchanged key it received from the mobile computing device in order to unlock and process a command 722 (e.g., open car door).

FIG. 7C illustrates an example of a message structure for communicating a set of restrictions when vehicle access is granted. A message 730 can list a set of restrictions 732, each of which are provided with a setting, indicating a value. For example, the restrictions can specify a geofence, whether trunk access is allowed, whether glove department access is allowed, a maximum speed that the vehicle can be driven, and the key source for the digital key. The message 730 can be encrypted using the digital key, and decrypted by the vehicle using an exchanged key.

FIG. 7D illustrates an example of a message structure for communicating a set of preferences for implementing vehicle configurations when vehicle access is granted. By way of example, the message 740 can specify a music or radio station preference, a climate control preference, a seat and steering wheel preference and a driving mode preference. The message 740 can be encrypted using the digital key, and the vehicle can decrypt the message to determine the configurations that are to be performed. In one implementation, a preference can be designated as being valid for an outdoor condition, corresponding to when the mobile computing device is outside of the vehicle.

Figure 8:
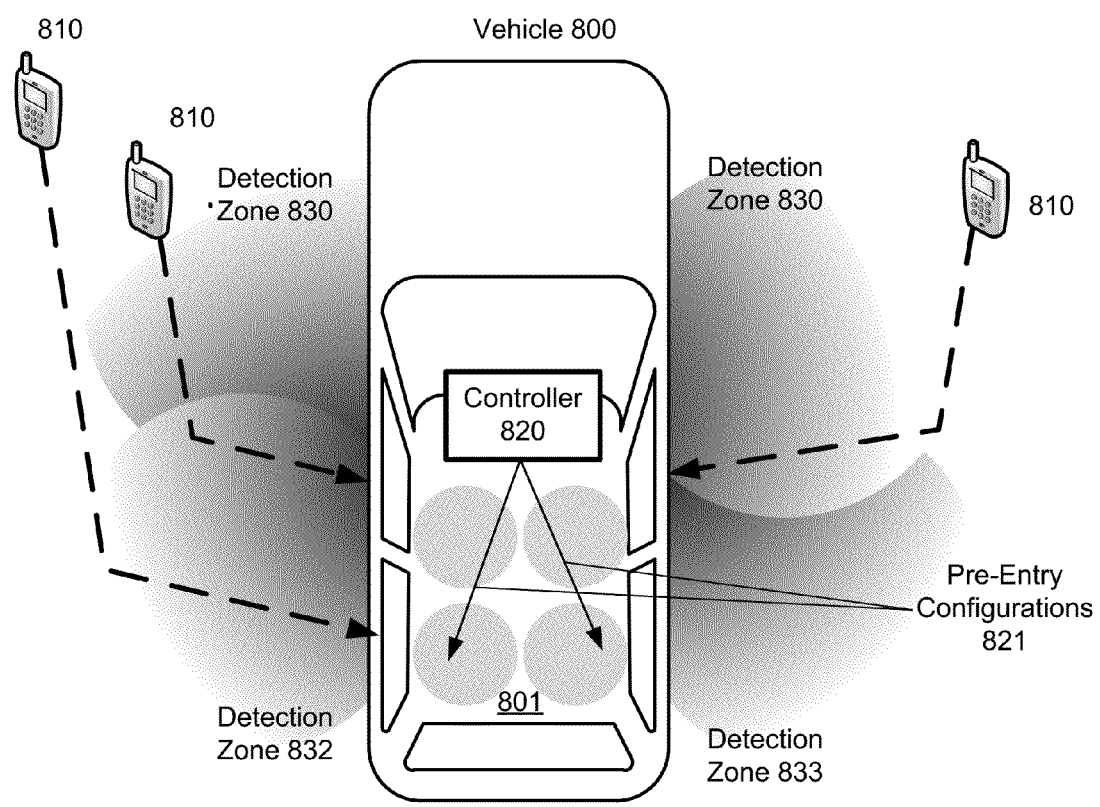
FIG. 8 illustrates an example vehicle with a controller that can perform various functions according to which detection zone mobile communication devices are located in, according to one or more embodiments.

FIG. 8 illustrates an example system including one or more mobile computing devices and a vehicle sub-system, according to one or more embodiments. A vehicle sub-system 801 can include a controller 820 and various interfaces to controlling operational or usage facets of the vehicle 800. The controller 820 can implement configurations based on communication of preferences 805 (e.g., encrypted message containing preferences and other profile information) by the individual devices 810, according to one or more embodiments. The controller 820 can also manage access features such as door locks and ignition switches, each of which are unlocked upon receipt of a digital key (e.g., command encrypted with the digital key). FIG. 8 illustrates an example in which multiple detection zones 830-833 are managed by the controller 820 in order to activate different functions when mobile computing devices 810 enter the zones.

In some aspects, the controller 820 monitors for the presence of mobile computing devices 810 in the vicinity of the vehicle 800, for example through the techniques described with FIGS. 6B-6C. In addition, this monitoring can be performed whether the vehicle 800 is turned on or off. When a user with a mobile computing device 810 approaches the vehicle 800, the controller 820 can detect which detection zone 830-833 the mobile computing device 810 is in and operate accordingly. For example, if a user approaches the driver side door, controller 820 can detect his or her mobile communication device 810 in detection zone 830 and perform a task such as unlocking the driver door or turning on the vehicle's inside lights. Controller 820 is also capable of detecting multiple mobile communication devices 810 in differing zones and, for example, unlocking any door that a user with a mobile communication device 810 approaches. Furthermore, controller 820 can continually monitor movement into, out of, and through the detection zones 830-833 in order to unlock the correct doors and relock doors if necessary.

Figure 9:
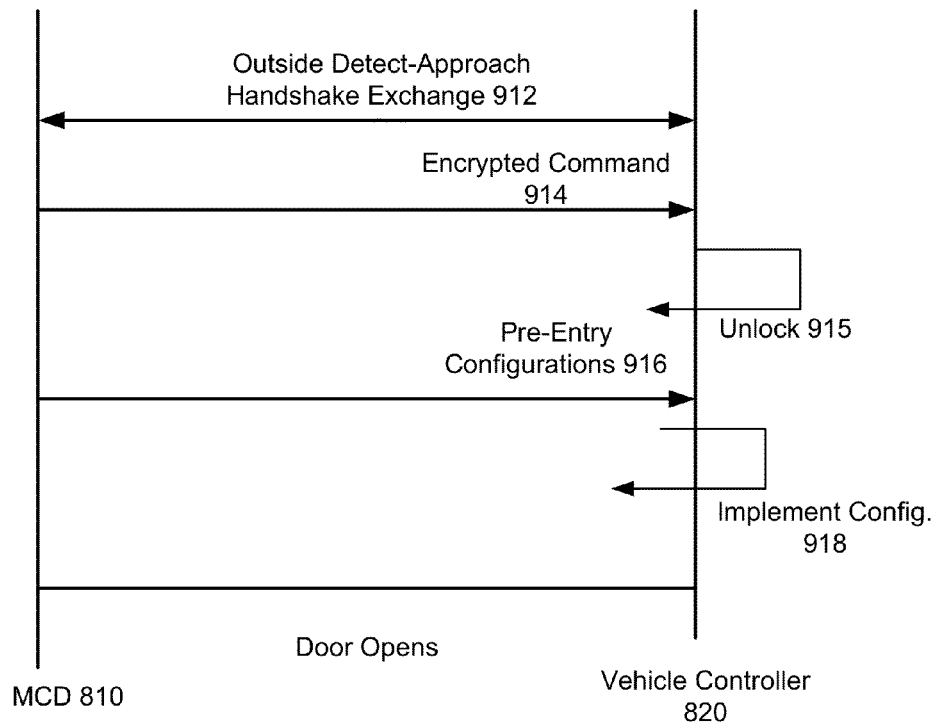
FIG. 9 illustrates a flow diagram of a method of using location determination to activate features of a vehicle, according to one or more embodiments.

As described with an example of FIG. 8 and FIG. 9, the determination that the mobile computing device is outside of the vehicle can be used to implement vehicle configurations that are designated for pre-entry ("pre-entry configurations 821") (e.g., before the user enters the vehicle). Thus, the controller 820 can use some profile information to implement pre-entry configurations 821 in advance of the mobile computing device 810 entering the vehicle.

Moreover, multiple computing devices 810 can use profile information in order to initiate implementation of different pre-entry configurations 821 when those mobile computing devices are outside of the vehicle 800. Thus, multiple operational or usage facets of the vehicle 800 can be configured at one time for multiple competing devices. Furthermore, even when multiple competing devices 810 are being used, such configurations can be used to implement pre-entry configurations 821 by the respective devices. By way of example, each of the mobile computing devices of 810 can specify configurations that include a seat position, a seat temperature, environmental temperature and lighting. In an example of FIG. 8, the preferences from which the pre-entry configurations 821 are determined can be signaled from one or more of the mobile computing devices that are outside of the vehicle.

FIG. 9 illustrates a flow diagram of a method of using location determination to activate features of a vehicle, according to one or more embodiments. A vehicle controller, such as controller 820 illustrated with FIG. 8, detects the presence of one or more mobile computing devices 810 and performs a handshake exchange 912. In some aspects, the handshake exchange 912 implements techniques described with FIGS. 6B-6C to determine the positioning of the mobile computing devices. In addition, an encrypted communication 914 conveying a command can be signaled from the mobile computing device 810 to the controller 820 in order to authenticate the devices for security reasons. The command can specify to unlock the vehicle, in which case the vehicle can implement the command 915.

According to some embodiments, once a device is authenticated, the mobile computing device 810 can signal pre-entry configurations 916. As described with other examples, this can occur when the mobile computing device 810 is outside of the vehicle. The pre-entry configurations 916 include configurations to the operational facets of the vehicle. The controller 820 can implement the pre-entry configurations 918 communicated from the mobile computing device 810. In some variations, the pre-entry configurations are implemented at a predicted location of where the user will be seated.

In some aspects, the vehicle controller 820 can implement user-specific preferences stored in association with the detected mobile computing device. At least some of these preferences can be implemented as pre-entry configurations 918. Preferences can include seat adjustments, temperature controls, mirror adjustments, music settings, and other similar adjustable vehicle features. These preferences can be stored on the controller, which loads the preferences based on detecting the mobile computing device in vicinity of the vehicle. In another implementation, the preferences are stored with the mobile computing device and can be sent along with or after the digital key and handshake are established.

User preferences can be determined and set by the vehicle controller 820 before the door is opened and the user enters the vehicle. In one implementation, once the user is inside the vehicle with his or her mobile computing device 810, other seating environment location techniques can be used to determine the user's seat location in order to change the preferences accordingly. For example, a person may enter the rear passenger door on the left and then slide over to the right side. In that case, his or her preferences may have been loaded for the rear left seat before entering, but can be transferred to the rear right seat after.

Figures 10A, 10B:
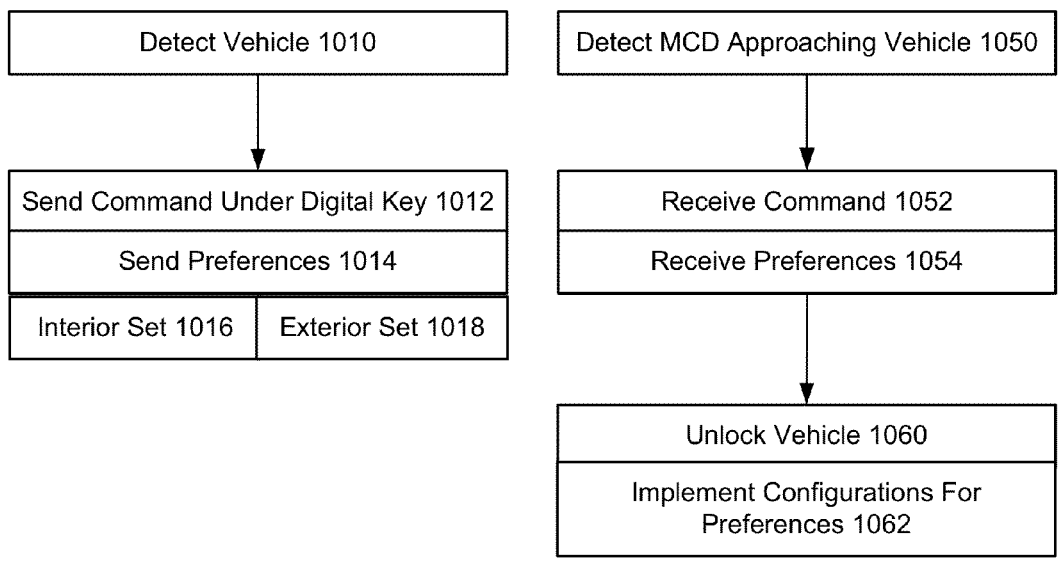
FIG. 10A and FIG. 10B illustrate example methods for implementing configurations within a vehicle based on profile information provided by a mobile computing device from which a unlock command is communicated.

FIG. 10A and FIG. 10B illustrate example methods for implementing configurations within a vehicle based on profile information provided by a mobile computing device from which a unlock command is communicated. In FIG. 10A, a mobile computing device 810 detects the vehicle 800 when one or more proximity conditions are satisfied (1010). The detection can be in the form of a handshake or other initial communication, when for example, the mobile computing device 810 and the vehicle 800 are in sufficient proximity for a corresponding short-range wireless communication channel.

Once the vehicle is detected, mobile computing device 810 can send an encrypted unlock command using the digital key of the vehicle (1012). The command can be in the form of a message (e.g., see message 740), which can include a set of preferences. Some of the preferences can be communicated as interior configurations (1016), for when the mobile computing device is inside the vehicle, such as at a particular seat location or occupancy zone. Other preferences can be implemented as exterior configurations (1018), implemented when the mobile computing device is outside of the vehicle. These configurations can, for example, be implemented as pre-entry configurations, so that configuration of one or more usage facet of the vehicle are initiated or complete when the mobile computing device 810 (and the accompanying user) enters the vehicle.

With reference to FIG. 10B, the vehicle 800 can detect the mobile computing device 810 approaching the vehicle (1050). The mechanism for detecting the mobile computing device 810 can also correspond to the ability of the controller 820 being able to exchange preliminary communications with the mobile computing device 810 by way of the device being sufficiently proximate to the vehicle 800.

The vehicle 800 can receive an encrypted command from the mobile computing device 800 (1052), which can be decrypted using an exchanged (e.g., previously received or generated from the digital key of the vehicle). The vehicle 800 can also receive a set of preferences, to be implemented as configurations within the vehicle (1054). The communications can include, for example, message 740 (see FIG. 7D), identifying a set of preferences of the user.

The controller 820 of vehicle 800 can implement the commands provided with the encrypted message, which can include unlocking the vehicle (1060) and implement configurations in accordance with the preferences (1062).

Interior Seat Position Determination

Figure 11:
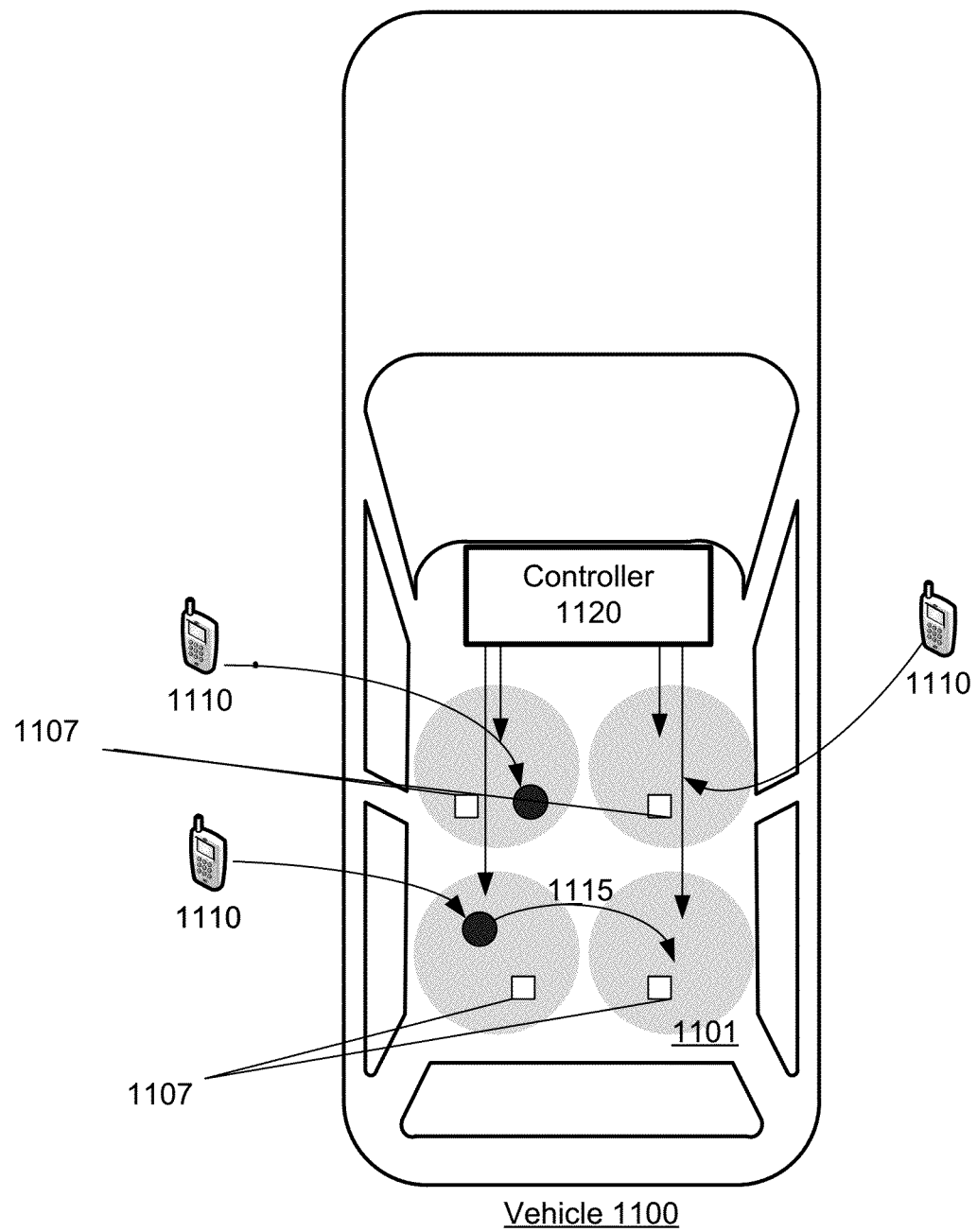
FIG. 11 illustrates an example system including one or more mobile computing devices and a vehicle sub-system, according to one or more embodiments.

FIG. 11 illustrates an example system including one or more mobile computing devices and a vehicle sub-system, according to one or more embodiments. The vehicle sub-system 1101 can include a controller 1120 and various interfaces to controlling operational or usage facets of the vehicle 1100. In an example of FIG. 11, multiple mobile computing devices 1110 or moved into the vehicle 1100 (e.g., by way of the uses caring them inside the car). The mobile computing devices can be carried into the vehicle at different times, for example the mobile computing device 1110 of the driver may enter the vehicle first. The vehicle sub-system 1101 includes controller 1120, which can interact with sensor resources 1107 within the vehicle, in order to generate a sensor comparison profile. The sensor comparison profile can be used by the mobile computing devices 1110 to determine the respective seat positions that are likely held by users who are carrying the respective mobile computing devices 1110.

According to some embodiments, sensor resources 1107 include seat sensors which record motion in connection with the user being seated. The motion sensors of the seats can correspond to, for example, accelerometers and/or gyroscopes. When the user sits on a given seat, the sensor resources 1107 outputs a sensor comparison profile that include sensor data reflecting the movement of the user on the seat (e.g., velocity or acceleration of the user downward, fidgeting, the transition as shown by 1115). According to some embodiments, mobile computing devices 1110 carried by the individuals also generate sensor movement profile data. Sensor correlation logic, as described below with various examples, can be used to compare sensor comparison profile 1105 of the vehicles at each seat to determine a strength of correlation. Based on a strength of correlation, the determination can be made as to which seat a particular mobile computing device is positioned in. As described in greater detail, the mobile computing devices 1110 and/or controller 1120 can include sensor correlation logic for comparing the sensor outputs of the various mobile computing devices with sensor comparison profile (e.g., seat accelerometer sensor profile generated when the user sits on the seat). Thus, the sensor correlation logic can be implemented in either a distributed fashion (e.g., by the individual devices as they enter the vehicle) or in a centralized fashion (e.g., by the controller 1120).

As an alternative, the sensor resource 1107 can correspond to a sensor event generator, which generates sensor event activity that is sufficient for detection by senses of particular types that are nearby. By way of example, sensor resource 1170 can generate magnetic fields, vibrations, and/or movements which can then be detected by sensors of mobile computing devices that happen on the respective seats. The sensor event can be sequenced, so that the seat position of individual mobile computing devices can be determined by correlating a sensor event of sensor resource 1107 at a particular instance of time and at a particular location to a particular mobile computing device based on a sensor output profile of that device. As described with some examples, position determination logic can be used to determine the seat position of individual mobile computing devices based on sequenced sensor event activity at or near individual seats. As with other localization logic, the position determination logic can be implemented in either a distributed fashion (e.g., by the individual devices as they enter the vehicle) or in a centralized fashion (e.g., by the controller 1120).

Upon determining the seat position of the mobile computing devices of 1110, the controller 1120 can implement configurations for some or all of the mobile computing devices, based on profile information communicated by the respective devices. The configurations of the controller of 1120 can affect, for example, various usage facets of the vehicle 1100. These can include the selection of content that is displayed on display screens at or near individual seats (e.g., display movie from mobile device), seat positions, lighting, the temperature, environmental temperature, media console setting and various other preferences and configurations thereof.

Figure 12:
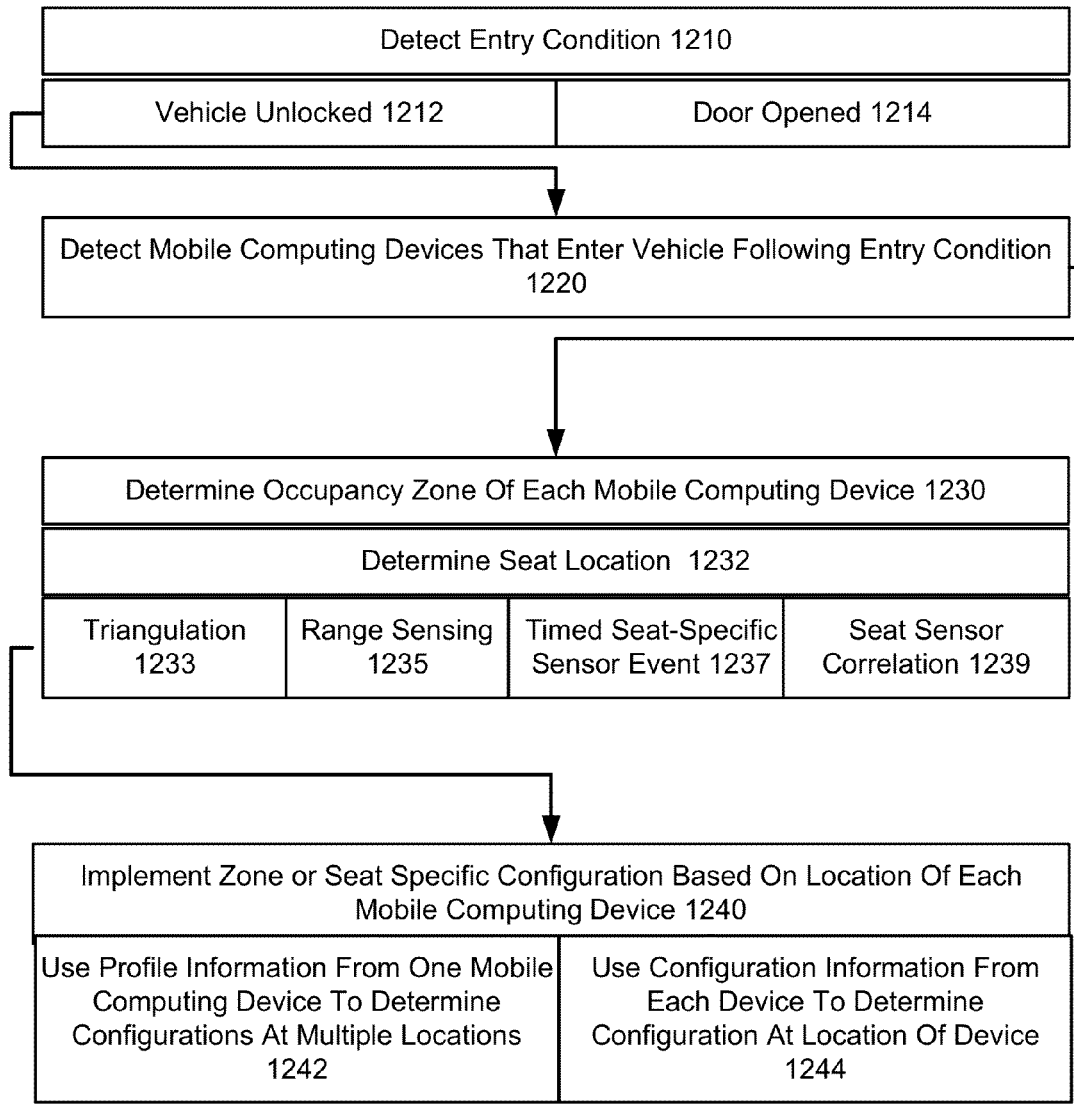
FIG. 12 illustrates a method for configuring a vehicle based on determination of a position of one or more mobile computing devices within the vehicle, according to an embodiment.

FIG. 12 illustrates a method for configuring a vehicle based on determination of a position of one or more mobile computing devices within the vehicle, according to an embodiment. With respect to an example of FIG. 12, an entry condition is detected (1210). By way of example, the entry condition can correspond to a vehicle door being unlocked (1212) or opened (1214). The mobile computing devices that enter the vehicle can be detected (1220). The occupancy zone of each mobile computing device can then be determined (1230).

In one implementation, the occupancy zone can correspond to a desired zone definition, such as seat row, driver/non-driver, or left/right side. The occupancy zone can more specifically apply to individual seats, or regions near individual seats. Thus, in some embodiments, the determination of occupancy zone can include logic for determining seat locations (1232). Various techniques are described herein for determining occupancy zones and seat positions for mobile computing devices within the vehicle. These techniques can include triangulation (1233), rain sensing (1235), timed seat specific sensor events, termed position determination logic in other examples (1237), and/or seat sensor correlation techniques, termed sensor correlation logic in other examples (1239).

Once the position of the individual mobile computing devices is determined, the zone or seat specific configurations can be implemented in the vehicle based on the profile data of the mobile computing devices and their respective locations (1240). In one implementation, profile data from one device can be used to determine configuration data for multiple devices (1242). For example, a parent can include configuration data for a child, who may have access to another parent's mobile device for purpose of the amusement when entering the vehicle. Still further, the configuration information provided from each device can specify desired configurations, including configurations for specific seats (1244). These configurations can be used to implement configurations the operational or usage facets of the vehicle at different seats or occupancy zones.

As described with some embodiments, localization functions described with an example method of FIG. 12 can be implemented using either distributed or centralized processing resources. For example, sensor correlation logic and/or position determination logic implemented can be implemented on individual mobile computing devices and/or the vehicle controller. In one distributed approach, the mobile computing devices can exchange communications as peers, make self-determinations of seat positions, compare their respective determination to those made by other devices, and select seat positions for each mobile computing device in the vehicle based on probability determinations and considerations. In variations, a single mobile computing device, or alternatively the controller of the vehicle, can make determinations of seat position by obtaining sensor profile outputs from the mobile computing.

Vehicle Seating Environment

Figure 13:
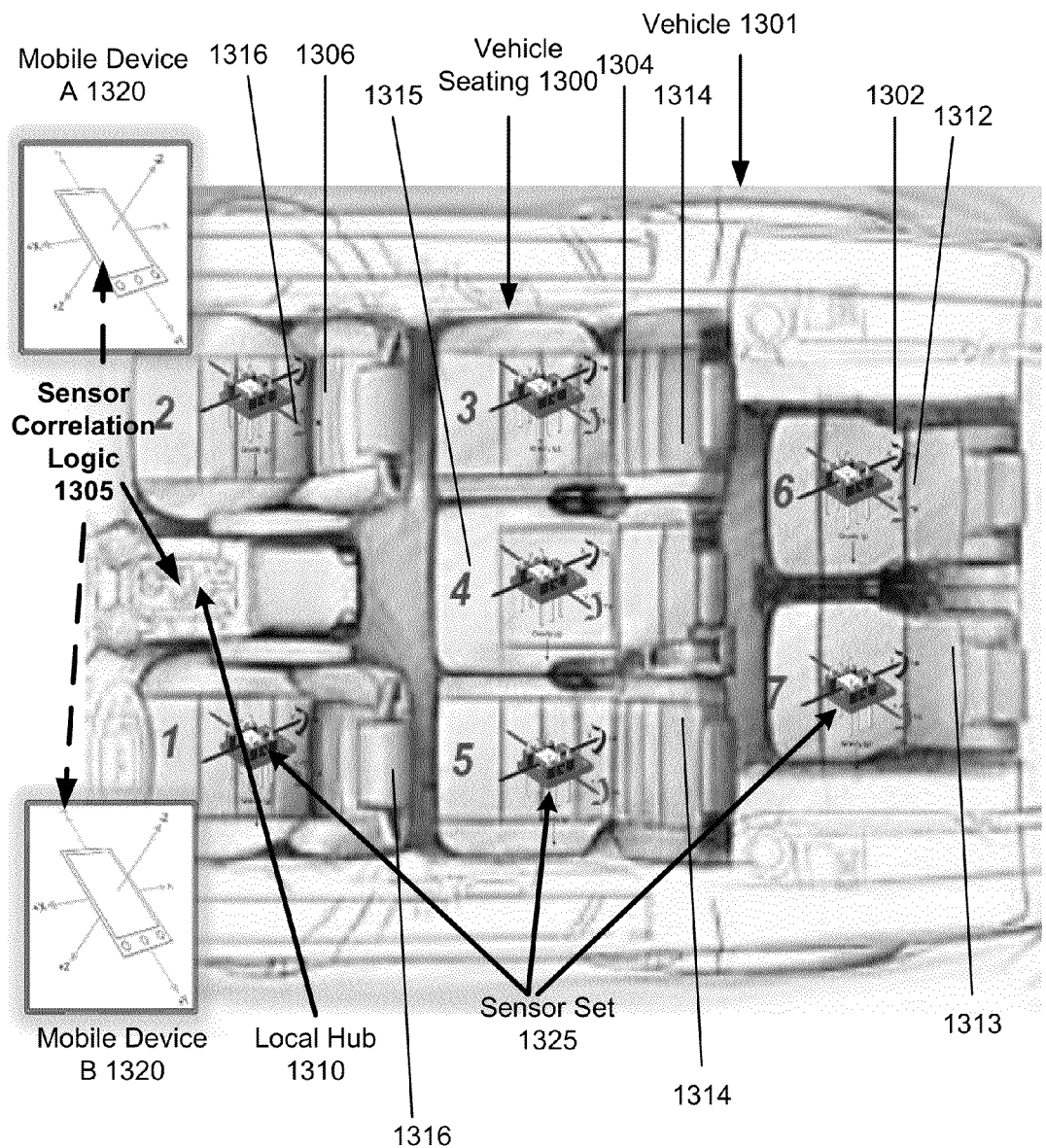
FIG. 13 illustrates a system for determining a likely seat location of a mobile computing device within a vehicle, according to an aspect.

FIG. 13 illustrates a system for determining a likely seat location of a mobile computing device within a vehicle, according to an aspect. In an example of FIG. 13, a vehicle seating environment 1300 is depicted as an interior of a vehicle with three seating rows: front row 1302, middle 1304, and back row 1306. A vehicle seating environment 1300 of an example of FIG. 13 is typically present within vehicles such as mini-vans, sport utility vehicles and some larger sedans. Some embodiments recognize that it is common for multiple passengers to enter a vehicle 1301 of the seating environment 1300 at one time. In such scenarios, many conventional approaches that can determine seat location of a mobile computing device lack sufficient granularity to pinpoint the likely seat of the user who holds the mobile computing device. For example, scenarios exist in which two passengers enter the vehicle and sit down at approximately the same time, or one passenger changes seats while another one takes another seating position. Even in such scenarios, an example of FIG. 13 can determine the likely seat locations of each mobile computing device.

In more detail, seating environment 1300 can include the front row 1302 with driver seat 1312 and passenger seat 1313, the middle row 1304 with the window seats 1314 and the middle seat 1315, and the back row 1306 with the seats 1316. In one implementation, the sensor set 1325 of each seat 1312-1316 measures motion, including motion of the vehicle as a whole. In one embodiment, the seating environment 1300 determines the seat location of individual mobile computing devices 1320 that are carried into the seating environment using a combination of seat sensors. More specifically, each of the seats 1312-1316 can include a corresponding sensor set 1324. An output from each of the sensor sets 1325 can be compared with a corresponding sensor output from each mobile computing device 1320 that is carried into the vehicle environment 1300.

The comparison can identify the seat 1312-1316 where a corresponding sensor set 1325 produces an output with the strongest correlation to a sensor output of one of the mobile computing devices 1320. In this way, each mobile computing device 1320 can be deemed to have the seat location that corresponds to the seat 1312-1316 with the strongest correlative sensor output.

In one example, the sensor set 1325 of each seat 1312-1316 measures linear (e.g., forward or lateral) and/or depth (or vertical) movement. For example, each seat 1312-1316 can include an integrated three-dimensional accelerometer that measures acceleration along three axes. When the user first sits in a given seat, the sensor set 1325 associated with that seat can measure a vertical (or Z-axis) acceleration. Likewise, the mobile computing device 1320 carried by the user can experience a similar vertical acceleration. The basis for determining similarity between the acceleration profiles of the seats and mobile computing devices can include, for example, an instance of time when the acceleration profiles were first created, a duration of time during which vertical acceleration occurs, a magnitude of the acceleration (e.g., how fast the user sank into the seat), the presence of seat shifting or lifting (e.g., user shifting in his or her seat or lifting a leg up) either during or after when the user sat down, or other actions which can affect vertical acceleration. Subsequently, when the vehicle begins to move, the lateral turns, bumps, and motion of the vehicle can have different effects on different regions of the vehicle. These characteristics may be reflected as points of correlation or non-correlation when comparison is made between the output of accelerometers of the mobile computing devices, as compared to the individual accelerometers that are provided with the individual seats 1312-1316.

As a variation to accelerometers, some embodiments provide for the use of alternative types of motion detection sensors, such as gyroscopes, to detect and measure aspects of motion from within the vehicle. Specifically, the sensor set 1325 of each seat 1312-1316 can include a gyroscope. Additionally, each mobile computing device 1320 can include a gyroscope, and the comparisons can identify correlations and non-correlations in the gyroscope outputs of the individual seat sensors 1325 and the individual mobile computing devices 1320.

Sensor correlation logic 1305 can be provided with the vehicle environment 1300 for use in determining correlation among sensor outputs. The sensor outputs can be used to determine the seat location of the mobile computing devices within the vehicle environment 1300. The sensor correlation logic 1305 can be provided in either a centralized or a distributed architecture, depending on implementation.

In a centralized system, a local hub 1310 can be provided within the vehicle to obtain sensor readings, determine seat locations of individual mobile computing devices within the vehicle environment 1300, and further to implement control or configuration based on determined seat locations of mobile computing devices. In one implementation, local hub 1310 includes a programmatic framework for enabling the local hub 1310 to establish wireless peer-to-peer connections with other devices within the vehicle. Using the wireless peer-to-peer connection, the local hub 1310 can (i) trigger or otherwise initiate individual devices to make sensor readings (e.g., initiate sensor readings upon door opening or closing), (ii) perform correlation analysis between sensor outputs of the individual seats and the mobile computing devices, (iii) determine the seat location of each mobile computing device in the vehicle, and/or (iv) implement control or other configurations regarding the functionality and use of the vehicle, and/or the functionality and use of the individual mobile computing devices, based on the determined seat locations. Depending on implementation, the sensor correlation logic 1305 can be used to determine (i) whether any given mobile computing device has a driver seat location or non-driver seat location, (ii) whether individual mobile computing devices are in the front row or not, or alternatively, which row, and/or (iii) the particular seat, from any seat of the vehicle environment, which is occupied by a user holding one of the mobile computing devices.

In a distributed system, one or more of the mobile computing devices 1320 can carry the sensor correlation logic 1305. In one implementation, one of the mobile computing devices is a master in implementing the sensor correlation logic 1305. The master mobile computing device can also include a seat map, so that seat identification can be made for correlating sensor output of the seat sensors to those of the mobile computing devices. Alternatively, the mobile computing devices can each carry sensor correlation logic 1305, and then exchange determinations in order to compare and more accurately predict the likely seat location of each device.

Figure 14A:
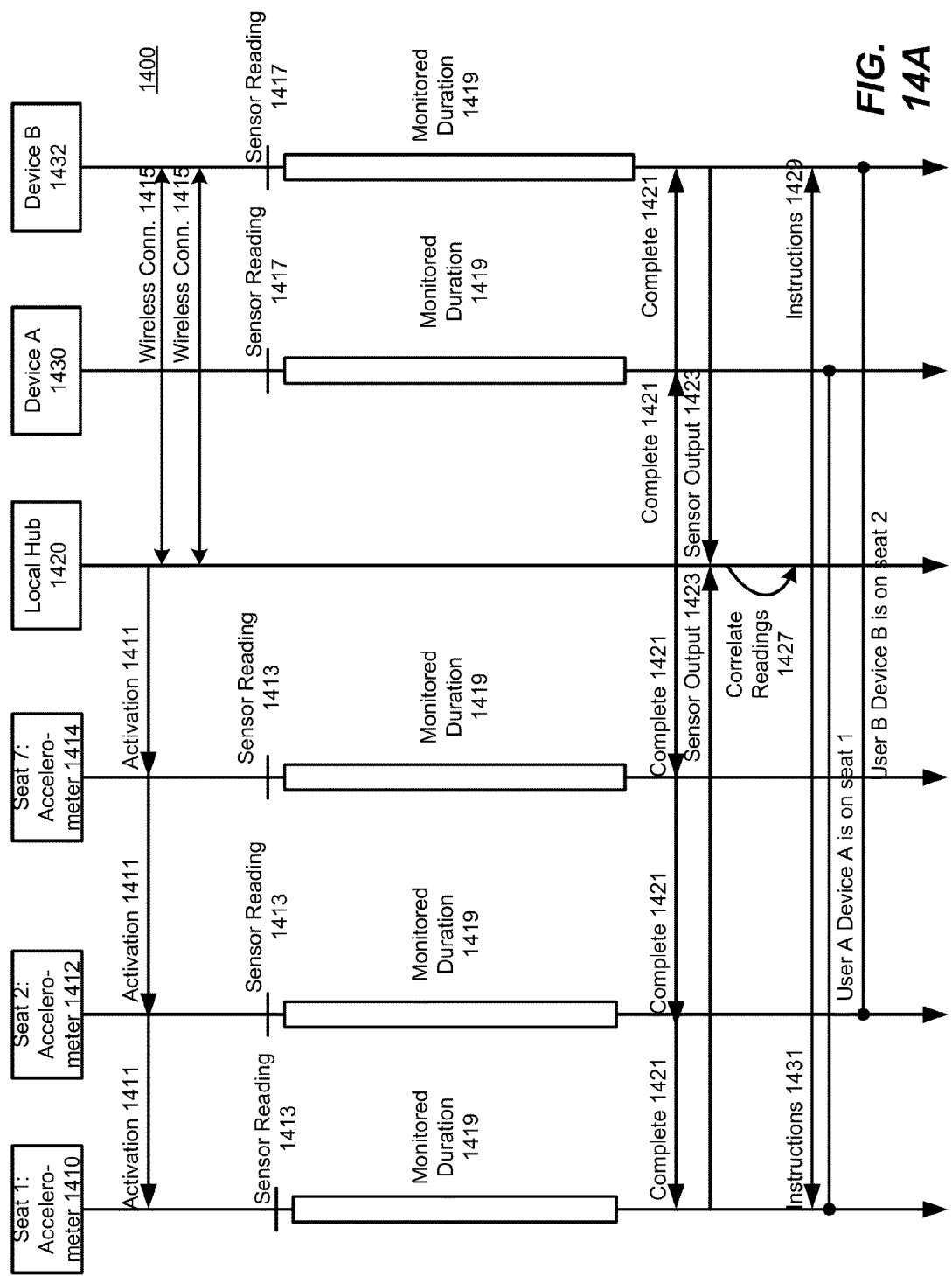
FIG. 14A illustrates a timing diagram for implementing a centralized sensor correlation system to determine a seat location of a mobile computing device, in accordance with an aspect of the disclosure.

FIG. 14A illustrates a timing diagram for implementing a centralized sensor correlation system to determine a seat location of a mobile computing device, according to an embodiment. The components of the centralized sensor correlation system 1400 include seat accelerometers 1410, 1412, 1414, a local hub 1420 (e.g., see also local hub 1310 of an example of FIG. 13), a first mobile computing device 1430, and a second mobile computing device 1434. Each accelerometer 1410-1414 represents a sensor set, and between one and many (e.g., 10) seat accelerometers can be used for vehicles depending on the number of seats employed. Similarly, more than one local hub 1420 can be used, particularly in larger vehicle seat environments (e.g., buses).

Initially, the local hub can trigger activation 1411 of each accelerometer 1410, 1414 in response to detection of a trigger event. By way of example, the trigger event can correspond to a vehicle door being opened when the vehicle is in an off-state. The activation 1411 from the local hub 1420 starts a sensor reading event 1413, in which each accelerometer 1410-1414 starts reading sensor values.

In a typical scenario, each mobile computing device 1430, 1432 is carried into the vehicle after the trigger event. The mobile computing devices 1430, 1432 can enter the vehicle at approximately the same time, or at measurably distinct times (e.g., one passenger enters the vehicle carrying his or her mobile computing device, and then several seconds later another passenger enters a vehicle caring his or her mobile computing device). Each mobile computing device 1430, 1432 can initiate a wireless connection 1415 with the local hub 1420. In one implementation, each wireless connection 1415 is a peer-to-peer connection, such as implemented through a Wi-Fi Direct protocol. In some variations, the mobile computing devices 1430, 1432 can also establish a wireless peer-to-peer connection with each other.

When the wireless connections are made between each mobile computing device 1430, 1432 and the local hub 1420, the local hub can signal each of the mobile computing devices to initiate a sensor reading event 1417. The sensor reading events 1417 can be time stamped and conducted for a monitoring duration 1419 that is pre-determined, or completed based on a designated event (e.g., vehicle movement, seat location determinations made for each mobile computing device, etc.). The monitoring duration 1419 of individual sensors can vary, particularly as each sensor may have a different start time.

The local hub 1420 can signal completion 1421 to each of the accelerometers 1410-1414 and mobile devices 1430, 1432. In response, the mobile computing devices 1430, 1432 and the accelerometer 1410-1414 can signal back a sensor output 1423, correspond to an accelerometer output profile for the respective monitored durations 1419. The local hub 1420 can perform processes 1427 for correlating the accelerometer profiles of individual devices, in order to determine the seat location of each of the mobile computing device 1430, 1432. Once determined, the local hub 1420 can signal instructions or configurations to the components of the vehicle and/or to the mobile computing device. For example, the local hub 1420 can signal instructions 1429 to the mobile computing devices 1430, 1432 in order to control or configure the use of those devices within the vehicle based on the determined seat assignment. For example, if mobile computing device 1430 is determined to be in the driver seat, certain functionality such as texting may be limited or disabled. Additionally, the local hub 1420 can send instructions 1431 to other operations of the vehicle based on the determined seat locations. For example, a display unit provided with the individual seats can be configured to render content from the particular mobile computing device that is deemed to be at the corresponding seat location.

Figure 14B:
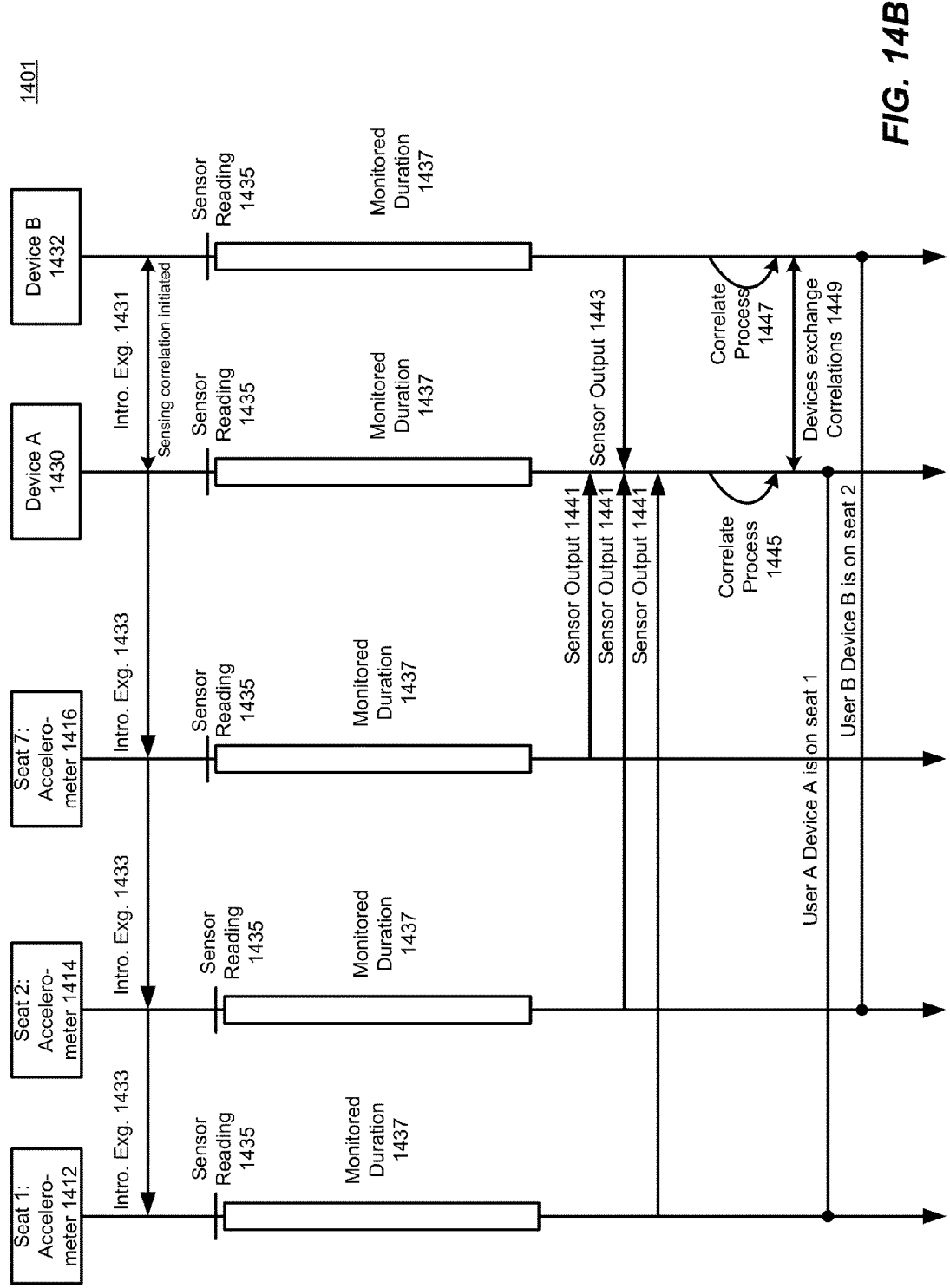
FIG. 14B illustrates a timing diagram for implementing a distributed sensor correlation system to determine a seat location of a mobile computing device, in accordance with an aspect of the disclosure.

FIG. 14B illustrates a timing diagram for implementing a distributed sensor correlation system to determine a seat location of a mobile computing device, according to an embodiment. The components of the distributed sensor correlation system 1401 include seat accelerometers 1410, 1412, 1414, first mobile computing device 1430, and second mobile computing device 1432.

One of the two mobile computing devices 1430, 1432 can be deemed a master for other computing devices of the vehicle based on some predefined or random determination. The mobile computing devices 1430, 1432 can signal a peer-to-peer wireless exchange with each other upon the devices being in proximity to each other and the accelerometers 1410-1414 of the vehicle. The master device, assumed as mobile computing device 1430, can use a peer-to-peer wireless channel to signal an introduction 1433 to accelerometers 1410-1414. The establishment of the wireless connections can, for example, signal a triggering event by which each of the accelerometers 1410-1414 initiate recording of sensor readings, along with the mobile computing devices 1430, 1432. Thus, the master mobile computing device 1430 can initiate a sensor reading event 1435.

The sensor reading events 1435 can be time stamped and conducted for a monitoring duration 1437 that is pre-determined, or completed based on a designated event (e.g., vehicle movement, seat location determinations made for each mobile computing device, etc.). The monitoring duration 1437 can last, for example, a set duration from when activated. Additionally, the sensors can have different start times with respect to reading values. Upon completion of the sensor readings (e.g., by self-timers), each of the accelerometers 1410-1414 can signal the master mobile computing device a sensor output 1441, corresponding to an accelerometer output profile for the respective monitored durations 1437. The other mobile computing device(s) 1432 can also signal back sensor outputs 1443. The master device can perform processes for correlating 1445 the accelerometer profiles of individual devices, in order to determine the seat location of itself and of each of the other mobile computing devices 1430, 1432.

In a variation, each mobile computing device 1430, 1432 performs its own correlation process 1445, 1447 for comparing the outputs 1441 of the sensors 1410-1414 to its own sensor readings. Each mobile computing device 1430, 1432 can exchange 1449 its results with the other device to confirm or combine the determinations of the two devices. The seat determinations 1451, 1453 for each mobile computing device 1430, 1432 can then be used to configure operations of the respective devices, or to configure aspects of the vehicle (e.g., select content is displayed on a seat monitor based on the mobile computing device in the corresponding seat).

Figure 15:
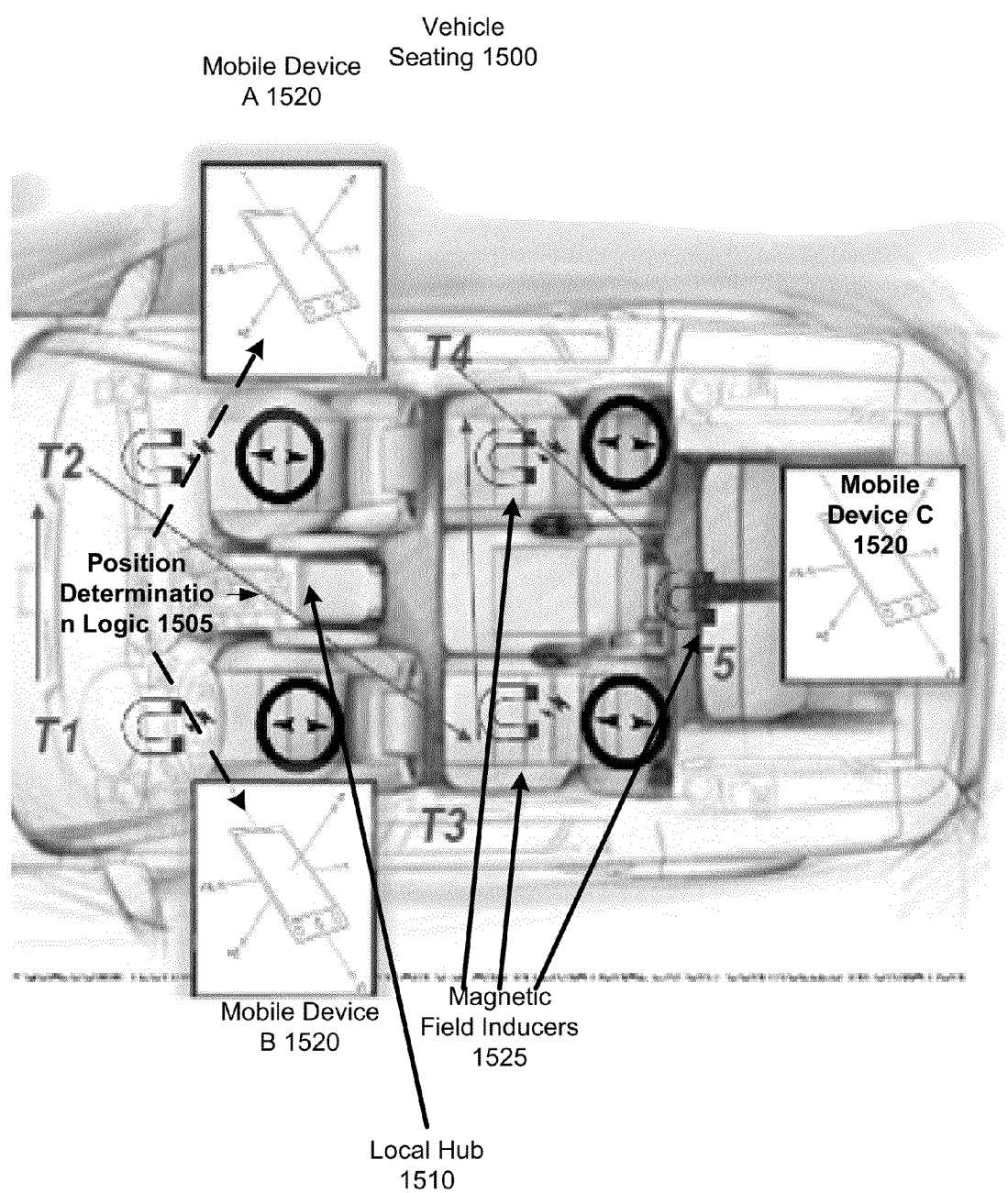
FIG. 15 illustrates an example vehicle seating environment with magnetic field inducers in accordance with an aspect of the disclosure.

FIG. 15 illustrates an example vehicle seating environment 1500 with magnetic field inducers 1525 in accordance with an aspect of the disclosure. In an example of FIG. 15, vehicle seating environment 1500 is depicted as the interior of a vehicle with three seating rows: a front row, middle row, and back row. There are also five magnetic field inducers 1525 illustrated inside the vehicle seating environment 1500: one with the driver's seat, passenger's seat, left middle row seat, right middle row seat, and back row.

In one aspect, position determination logic 1505 in the seating environment 1500 determines the seat location of individual mobile devices 1520 that are carried into the seating environment using one or more magnetic field inducers 1525. Position determination logic 1505 can be provided with the vehicle seating environment 1500 for comparing, between the mobile devices 1520, strengths and directions of magnetic fields generated by the magnetic field inducers 1525. The position determination logic 1505 can be provided in either a centralized or a distributed architecture, depending on implementation.

In a centralized version, a local hub 1510 can be provided with the vehicle to send commands to magnetic field inducers 1525 to generate magnetic fields for a specific period of time, receive magnetometer readings from the mobile devices 1520, and determine seat locations of the mobile devices 1520. In one implementation, local hub 1510 includes a programmatic framework for enabling the local hub 1510 to establish wireless peer-to-peer connections with other devices within the vehicle. Using the wireless peer-to-peer connection, the local hub 1510 can (i) trigger magnetic field inducers 1525 to generate magnetic fields, (ii) perform a position determination analysis based on magnetometer readings from the individual mobile computing devices, (iii) determine the seat location of each mobile computing device in the vehicle, and/or (iv) implement control or other configurations regarding the functionality in use of the vehicle and control the functionality and use of the individual mobile computing devices based on the determined seat locations.

In a distributed system, one or more of the mobile computing devices 1520 can carry the position determination logic 1505. In one implementation, one of the mobile computing devices 1520 is a master in implementing the position determination logic 1505. The master mobile computing device can also include a seat map, so that seat identification can be made for correlating sensor output of the seat sensors to those of the mobile computing devices. In other implementations, each of the mobile computing devices 1520 identifies its own seat and compares results with the other mobile computing devices 1520 to reach a consensus as to which devices are located in which seats.

In one aspect, the device responsible for position determination (i.e., local hub 1510 or a mobile computing device 1520) triggers each of the magnetic field inducers 1525 to generate a magnetic field one at a time with no overlap. For example, at time T1, the magnetic field inducer 1525 on the driver's seat generates a magnetic field for a specific amount of time. During this period, magnetometers on mobile devices 1520 detect the magnetic field. Since the magnetic field inducer 1525 is on the driver's seat, a mobile device 1520 on the driver's seat may record a strong magnetic field, whereas a mobile device 1520 in the back seat may not detect the magnetic field at all. At time T2, the magnetic field inducer 1525 on the driver's seat turns off its field and the magnetic field inducer 1525 on the passenger's seat generates a magnetic field for a specific amount of time. This continues for T3, T4, and T5. After all the magnetic field inducers 1525 have generated their fields, position determination logic 1505 uses the magnetometer readings from the mobile devices 1520 at each time interval to determine which seat each mobile device 1520 is located on.

In another aspect, vehicle seating environment 1500 may only contain a single magnetic field inducer, which may or may not be associated with a seat. For example, the single inducer can be located between seats, such as on a center console. In this aspect, the strength and direction of a magnetic field generated by the single inducer can be used to determine seat locations for mobile communication devices.

Figure 16A:
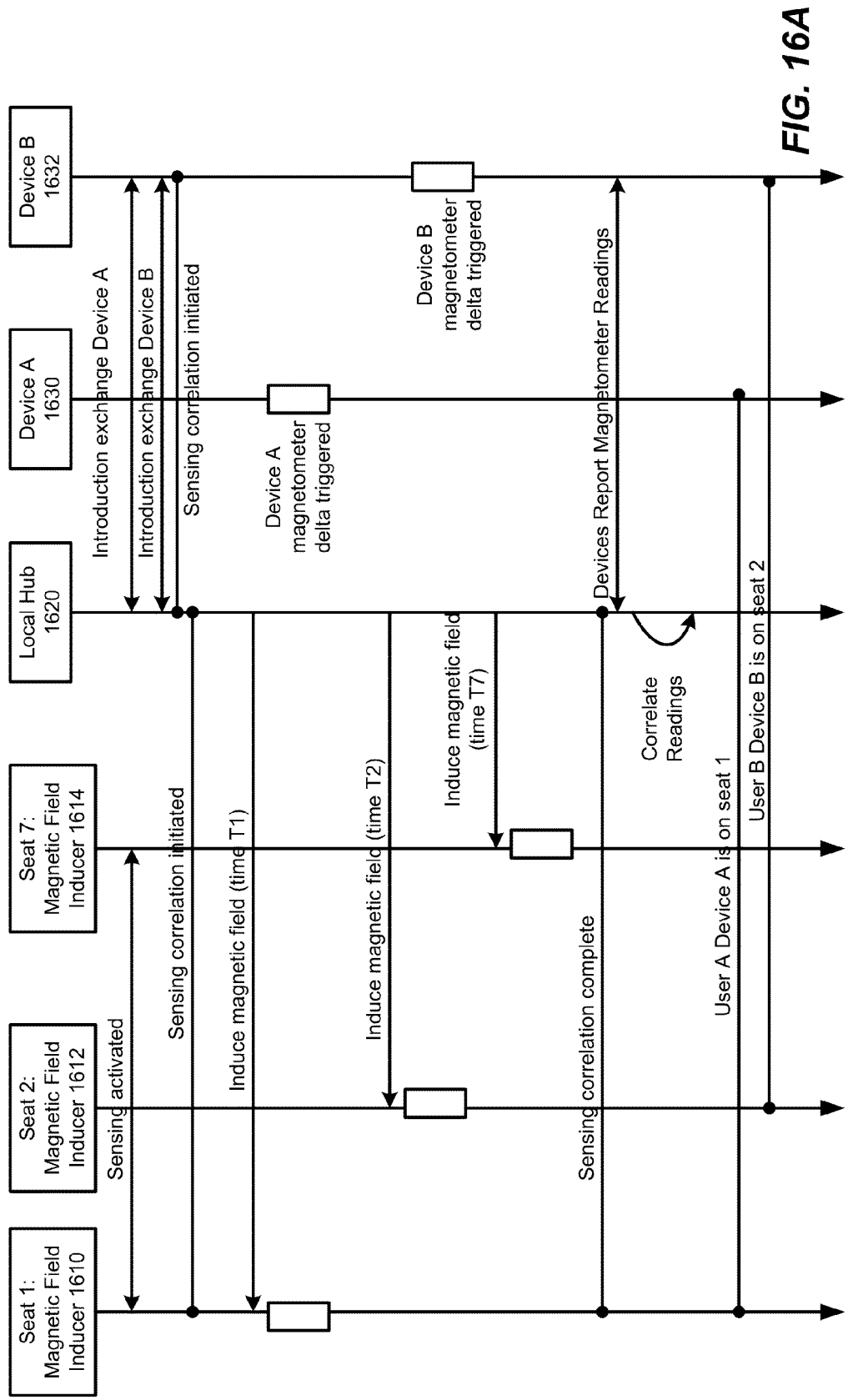
FIG. 16A illustrates a process flow diagram for using magnetic field inducers and a local hub for seat determination in accordance with an aspect of the disclosure.

FIG. 16A illustrates a process flow diagram for using magnetic field inducers 1610, 1612, 1614 and a local hub 1620 for seat determination in accordance with an aspect of the disclosure. In this example process flow diagram, actions are taken in sequence from the top of the flow diagram to the bottom. Actions parallel to one another may be performed simultaneously.

In a centralized system, the local hub and mobile devices exchange information, for example over a local wireless connection such as provided by Wi-Fi Direct. Magnetic field inducers on each seat and mobile communication devices can enter a sensing activation mode, which can be in response to a trigger, where they wait for commands from the local hub 1620.

At time T1, the local hub 1620 instructs the magnetic field inducer on seat 1 to generate a magnetic field for a specified period of time. While this magnetic field is being induced, magnetometers on mobile communication devices attempt to detect the field. In the example shown in FIG. 16A, the magnetometer on Device A 1630 is triggered during time T1. Next, at time T2, the local hub 1620 instructs the magnetic field inducer on seat 2 to generate a magnetic field for a specified period of time. This time, the magnetometer on Device B 1632 is triggered. In some aspects, triggering the magnetometer delta requires the detection of a magnetic field of at least a predefined strength. If a device magnetometer delta is triggered by fields generated by more than one inducer, the strongest field detected may be used in seat determination.

The local hub 1620 continues inducing magnetic fields for each seat magnetic field inducer until all of them have generated a magnetic field. At this point, the sensing correlation is complete and mobile communication devices report their magnetometer readings. In other aspects, mobile communication devices can report their readings when a delta is triggered or at specified intervals. With readings from one or more of the devices, the local hub 1620 correlates the times of the readings to determine which magnetic field inducer was actively generating a magnetic field when each device triggered its magnetometer delta. Based on this determination, the local hub 1620 can assign each device to a corresponding seat in the vehicle seating environment. In the example of FIG. 16A, Device A 1630 is on seat 1, and Device B 1632 is on seat 2.

Figure 16B:
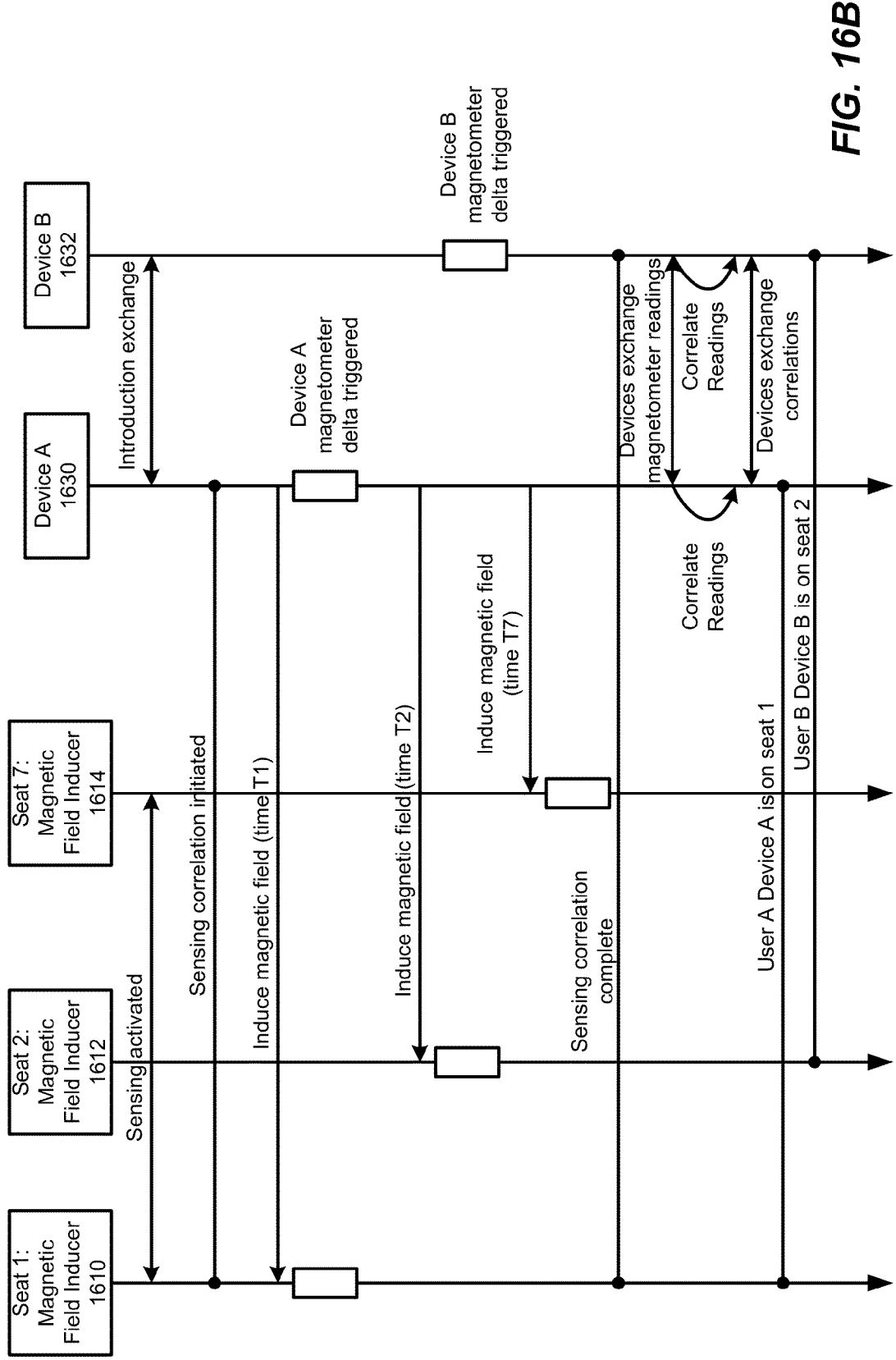
FIG. 16B illustrates a process flow diagram for using magnetic field inducers and inter-device communication for seat determination in accordance with an aspect of the disclosure.

FIG. 16B illustrates a process flow diagram for using magnetic field inducers 1610, 1612, 1614 and inter-device communication for seat determination in accordance with an aspect of the disclosure. In this example process flow diagram, actions are taken in sequence from the top of the flow diagram to the bottom. Actions parallel to one another may be performed simultaneously.

In a distributed system with no local hub, mobile communication devices exchange information amongst themselves, for example over a proximal wireless connection. Magnetic field inducers on each seat and mobile communication devices can enter a sensing activation mode, which can be in response to a trigger, where they wait for commands from the mobile communication devices.

In some implementations, one of the mobile communication devices can act as a master, in this example Device A 1630. At time T1, Device A 1630 instructs the magnetic field inducer on seat 1 to generate a magnetic field for a specified period of time. While this magnetic field is being induced, magnetometers on mobile communication devices attempt to detect the field. In the example shown in FIG. 16B, the magnetometer on Device A 1630 is triggered during time T1. Next, at time T2, Device A 1630 instructs the magnetic field inducer on seat 2 to generate a magnetic field for a specified period of time. This time, the magnetometer on Device B 1632 is triggered. In some aspects, triggering the magnetometer delta requires the detection of a magnetic field of at least a predefined strength. If a device magnetometer delta is triggered by fields generated by more than one inducer, the strongest field detected may be used in seat determination.

Device A 1630 continues inducing magnetic fields for each seat magnetic field inducer until all of them have generated a magnetic field. At this point, the sensing correlation is complete and mobile communication devices exchange their magnetometer readings. In other aspects, mobile communication devices can exchange their readings each time a delta is triggered or at specified intervals. With readings from one or more of the devices, the mobile communication devices correlate the times of the readings to determine which magnetic field inducer was actively generating a magnetic field when each device triggered its magnetometer delta. Based on this determination, the mobile communication devices can assign each device to a corresponding seat in the vehicle seating environment. In the example of FIG. 16A, Device A 1630 is on seat 1, and Device B 1632 is on seat 2. In some implementations, a master device can use position determination logic to correlate the readings and then send its results to the other mobile communication devices.

With respect to examples of FIG. 15-16B, each of the mobile computing devices can be implemented under IEEE Specifications of 802.11(a), 802.11(b), 802.11(g), or 802.11(n) (collectively "Wi-Fi" or "Wi-Fi network"), or other wireless connection mediums such as Bluetooth, Bluetooth LE, wireless USB. Still further, each of the devices can be implemented to communicate with other devices using a direct, wireless peer-to-peer communication protocol, such as provided by Wi-Fi Direct. Other implementations may include wired network mediums, such as Ethernet or Automotive Ethernet. In order to facilitate communication and interoperability, the mobile computing devices, as well as the seat sensors (if used), actuators and/or can share a common computing or communication platform, such as provided through ALLJOYN, as hosted by ALLSEEN ALLIANCE.

Figure 17:
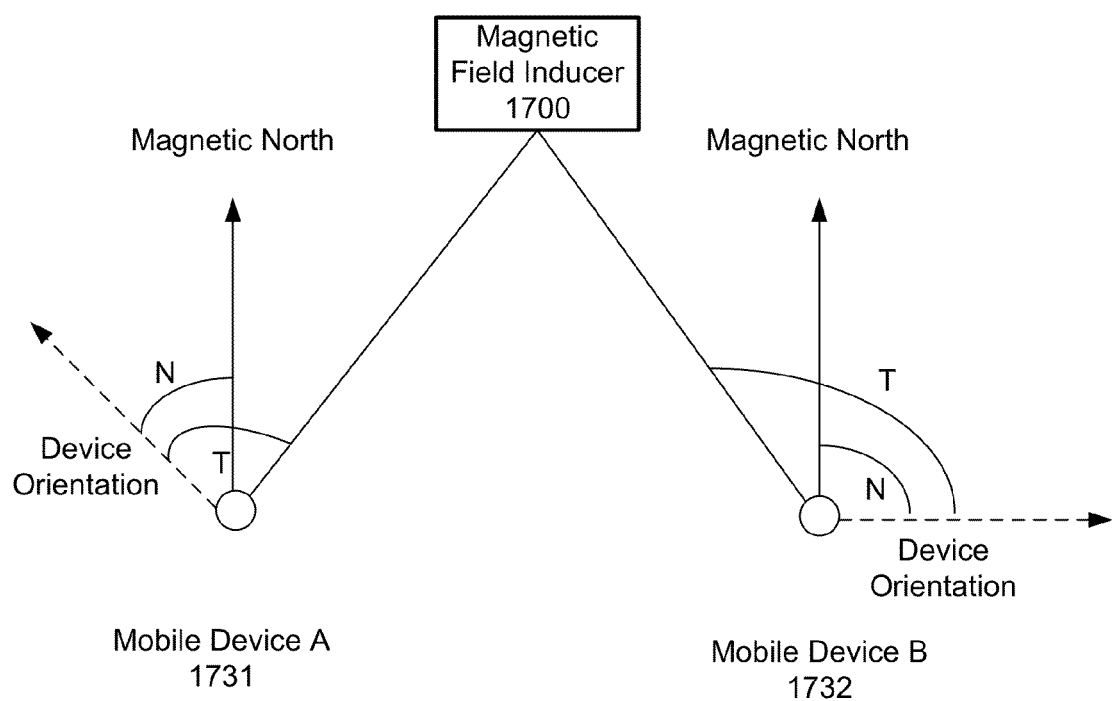
FIG. 17 illustrates an example of determining seat location using magnetometers in mobile devices in accordance with an aspect of the disclosure.

FIG. 17 illustrates an example of determining seat location using magnetometers in mobile devices in accordance with an aspect of the disclosure. In this example, there is only a single magnetic field inducer, which may or may not be on a seat in a given seating environment. Mobile device A 1731 and mobile device B 1732 are within the range of a magnetic field generated by the magnetic field inducer 1700 and equipped with magnetometers to detect the field. By detecting a direction of the field and knowing the location of magnetic field inducer 1700, position determination logic (such as provided with a local hub or on the mobile communication devices) can match each mobile communication device to a given seat in a given seating environment.

In this example, mobile device A 1731 is oriented left and forward, and mobile device B is oriented to the right. Angle T represents the angle from the orientation of the device to the detected magnetic field generated by the magnetic field inducer 1700. Angle N represents the angle from the device orientation to magnetic north, which can be located using a compass, gyrocompass, or other similar component on the mobile communication device. By subtracting angle N from angle T, a normalized angle to the magnetic field inducer with respect to magnetic north can be calculated. Based on this angle, position determination logic can calculate in which direction the mobile device is from the magnetic field inducer. Combined with the known location of magnetic field inducer and seats in a seating environment (such as on a seat map), the seats for mobile device A 1731 and mobile device B 1732 can be determined.

Figure 18:
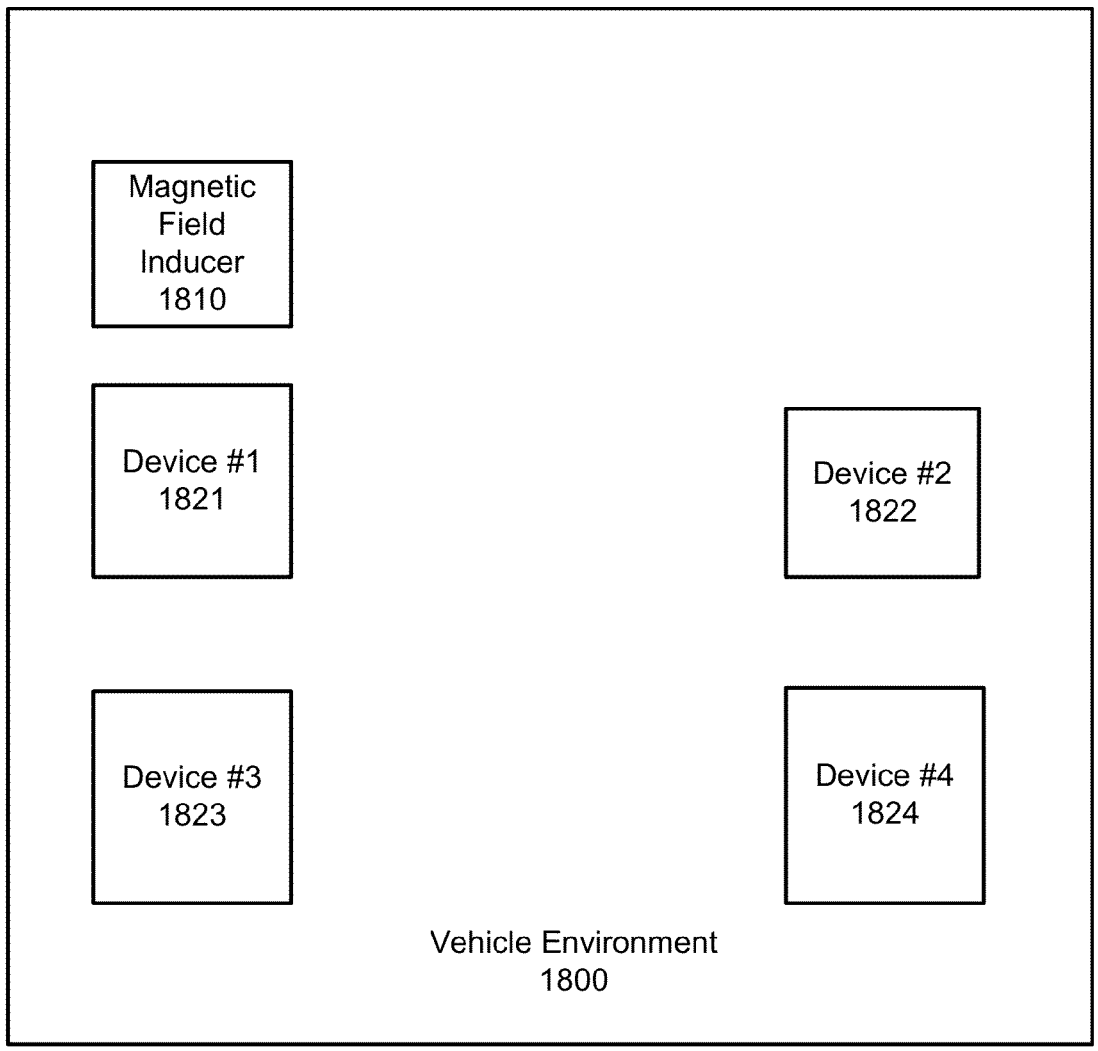
FIG. 18 illustrates an example seating environment with a single magnetic field inducer external to the seats in accordance with an aspect of the disclosure.

FIG. 18 illustrates an example vehicle environment 1800 with a single magnetic field inducer 1810 external to the seats in accordance with an aspect of the disclosure. In this example, there is only a single magnetic field inducer 1810, which is not located on any of the seats in the vehicle environment 1800. However, using the technique described in the prior figure combined with the strengths of the detected magnetic field, the seats associated with device #1 1821, device #2 1822, device #3 1823, and device #4 1824 can be calculated. For example, when magnetic field inducer 1010 generates a magnetic field, device #1 1821 detects that the magnetic field is to the north. Using sensor profile information or a seat map, positioning determination logic either on a local hub or on one of the mobile communication devices can determine possible seats for device #1 1821. However, in this example, device #3 1823 has the same normalized angle to the magnetic field. By detecting the strength of the field at each device, positioning determination logic can determine that device #1 1821 is closer to the magnetic field inducer 1810 than device #3 is, and therefore device #1 1821 is located on the seat which is closer to magnetic field inducer 1810.

Methodology

Figure 19:
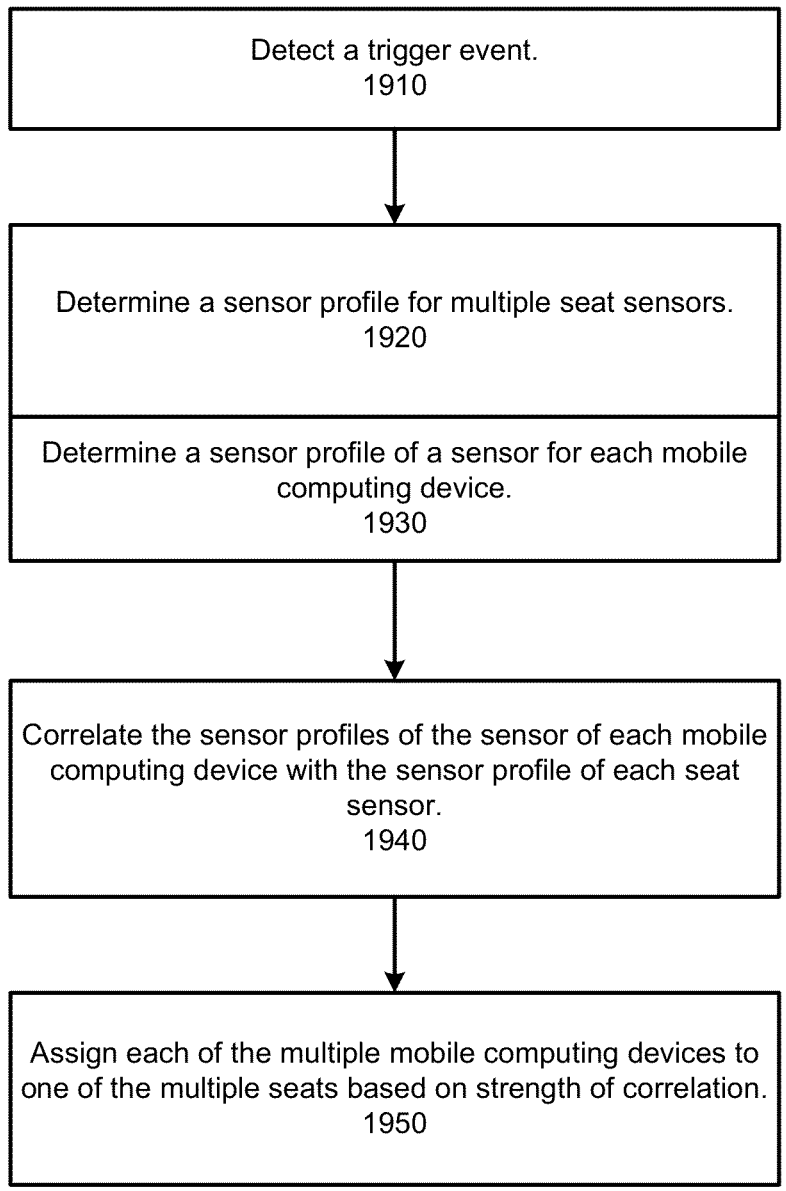
FIG. 19 illustrates an example method for correlating sensor data to seat locations in accordance with an aspect of the disclosure.
Figure 20:
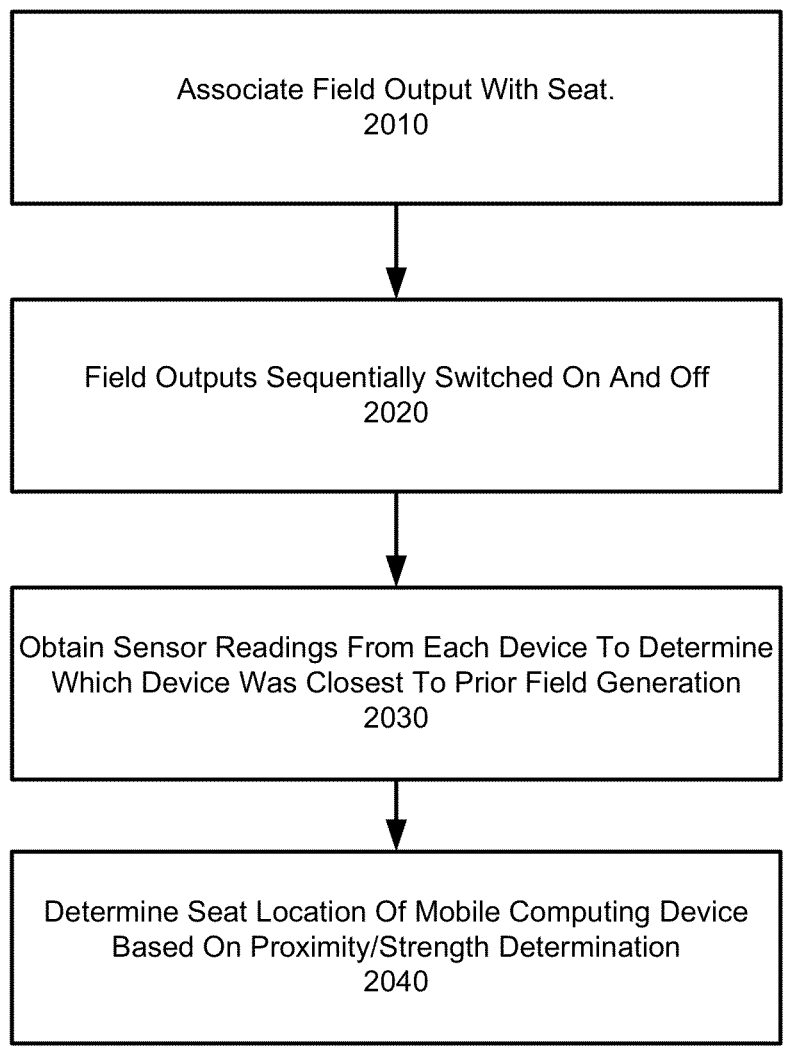
FIG. 20 illustrates an example method for mapping detected magnetic fields to seat locations in accordance with an aspect of the disclosure.

FIG. 19 illustrates an example method for correlating sensor data to seat locations in accordance with an aspect of the disclosure. FIG. 20 illustrates an example method for mapping seat locations to field output in accordance with an aspect of the disclosure. While operations of these methods are described below as being performed by specific components, modules or systems in a seating environment, these operations need not be performed by the specific components identified, and could be performed by a variety of components and modules, potentially distributed over a number of machines. Accordingly, in describing an example of FIG. 19 or FIG. 20, reference may be made to elements of other examples for the purpose of illustrating suitable components or elements for performing a step or sub step being described. Alternatively, at least certain ones of the variety of components and modules described in other examples can be arranged within a single hardware, software, or firmware component. In addition, some of the steps of this method may be performed in parallel or in a different order than illustrated.

An example method of FIG. 19 can be implemented on a local hub, or with one or more mobile computing devices that are provided within a vehicle. A trigger event can be detected from either a local hub or mobile computing device that is carried into a vehicle (1910). By way of example, the trigger can correspond to a vehicle door opening or closing (1910). In response to the trigger event, a sensor profile is determined for multiple seat sensors (1920). In some aspects, each seat sensor is individually provided with each seat in the seating environment, and the sensor profile for each seat sensor is determined over a given duration of time. A sensor profile can also be determined each of the mobile communication devices (1930). The sensor profile can correspond to, for example, an accelerometer profile With the sensor profiles for seat sensors and mobile computing devices, the sensor output profiles can be correlated based on correlations from the sensor output profiles, such as comparisons of the sensor output time at the same instances in time (1940). Each of the multiple mobile computing devices can be assigned to one of the multiple seats in the seating environment based on strength of correlation (1950).

With reference to an example of FIG. 20, a source of a field output is associated with individual seats of a vehicle (2010). By way of example, the field output can correspond to a magnetic field. In variations, the field output can correspond to an audio signal or an optical signal. The associations can be made by way of proximity linking a discrete and timed field output event with a particular seat in the vehicle. When multiple field outputs are individually associated with seats of a vehicle, the field outputs are sequentially switched on then off (2020). With each on/off even, sensor readings are obtained from each mobile computing device (2030). Each device can be linked to the field output of the seat where the device sensor detected the strongest magnitude of detection (2040).

In one implementation, for example, magnetometer readings can be made from at least one mobile computing device located in the seating environment. The magnetometer readings can be determined from an act of pulsing a magnetic field source associated with each seat of the vehicle, so that a given mobile computing device is likely assigned to the vehicle with the strongest correlation or signal detection when the magnetic field from a particular seat is pulsed detected. In some examples, magnetometers provided with the mobile computing devices measure the strength and direction of a magnetic field induced at a designated location within the seating environment. The local hub or one or more mobile communication devices in the seating environment can determine proximity and/or orientation of each of the mobile communication devices to one or more sources of the induced magnetic fields. In some examples, determining the proximity is based at least in part on the strength of the magnetic field induced at a designated location within the seating environment. Additionally, the local hub or one or more mobile communication devices can link each of the mobile communication devices to a particular region within the seating environment based on the determined proximity and/or orientation of each mobile computing device to the one or more sources of magnetic fields (2030).

In variations, alternatives to magnetic fields and pulses can be used for purpose of detecting sensor-events that are initiated from or near individual seats. For example, an acoustic signal can be generated from an individual seat and then measured on each device to determine which device is closest to the signal. Multiple acoustic signals can be generated for different seats in order to identify which seat a particular mobile computing device of the vehicle is most proximate to.

An example of FIG. 20 can be implemented using position determination logic, such as described with examples of FIGS. 1D-F. The position determination logic can, for example, compare sensor readings from devices at discrete time periods coinciding with a purposefully manufactured and seat-specific sensor detectable event. Such events can be triggered at locations that coincide with specific seats within a seating environment, and the event that is triggered from each seat can have a distinct identifiable time period from events that occur at other nearby seats. When the events are generated in a sequential time pattern, the position determination logic can compare sensor readings from each device to determine which device was most likely the one at or near the seat from which the sensor event was triggered. The sensor readings can include, for example, magnitude or strength of sensor reading, and in some cases like magnetic field events, directional information.

While some examples such as provided with FIG. 20 provide for magnetic field generation as a sensor event, other examples can use alternative forms of sensing. By way of example, in one implementation, each seat in a vehicle (or other seating environment) can be vibrated for a duration of time, and accelerometer or gyroscope data from each mobile computing device can be compared for detection of the sensing event at the particular time interval. For example, accelerometer readings from each device can compare magnitude/strength of the accelerometer readings during the sensed event to determine which mobile computing device is likely at a vibrating seat.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer-implemented method for implementing vehicle configurations, the method being implemented by one or more processors and comprising:
    detecting one or more mobile computing devices;
    determining a sensor comparison profile for each seat of a vehicle, from a sensor input or output (I/O) resource provided with or in proximity to each seat;
    determining a sensor output profile from a motion sensor of each of the one or more mobile computing devices;
    determining a seat position of each mobile computing device based on a comparison of the sensor output profile of each mobile computing device and the sensor comparison profile for each seat;
    obtaining profile information from a specific mobile computing device which is in closest proximity to a specific operational or usage facet of the vehicle; and
    initiating configuration of one or more operational or usage facets of the vehicle, including configuration of the specific operational or usage facet using the profile information of the specific mobile computing device.

2. The method of claim 1, further comprising:
    detecting at least one of: a mobile computing device communicating a digital key to unlock the vehicle, a door of the vehicle being opened or closed, or a seat of the vehicle being occupied.

3. The method of claim 1, wherein initiating the configuration comprises:
    configuring multiple types of operational or usage facets of the vehicle based on the profile information.

4. The method of claim 3, wherein each type of operational or usage facet may correspond to one of a seat position or orientation, content setting or media output selection from a media output device, lighting, seat temperature, or air temperature.

5. The method of claim 1, wherein the proximity is determined by the specific mobile computing device.

6. The method of claim 1, wherein the one or more mobile computing devices each operate a common communication platform within the vehicle for enabling wireless communication exchanges amongst the one or more mobile computing devices as peers.

7. The method of claim 1, wherein the specific mobile computing device operates a common communication platform with a controller of the vehicle, and wherein the proximity is determined by the controller.

8. The method of claim 1, wherein the profile information includes preferences that are specific to the vehicle.

9. The method of claim 1, wherein the profile information includes preferences that are non-specific to the vehicle.

10. The method of claim 1, wherein the specific mobile computing device includes profile information for multiple users.

11. The method of claim 1, wherein each seat position corresponds to at least one of: a seat row in which a user of each mobile computing device is determined to be seated, a left or right region of the vehicle in which the user of each mobile computing device is determined to be seated, or a designation of whether the user of each mobile computing device is a driver or a passenger of the vehicle.

12. The method of claim 1, further comprising:
    determining a seat location of the specific mobile computing device.

13. The method of claim 12, further comprising:
    determining an identity of a user of the specific mobile computing device based at least in part on the determined seat location.

14. The method of claim 12, wherein determining the seat location comprises:
    communicating with motion sensors provided with each seat within the vehicle to receive a corresponding seat sensor output profile for each seat;
    determining a device sensor output profile from a motion sensor of the specific mobile computing device;
    determining, for each seat, a strength of correlation between the device sensor output profile and the seat sensor output profile for the corresponding seat; and
    determining the seat location of the specific mobile computing device based on the strength of correlation for each seat.

15. The method of claim 12, wherein determining the seat location comprises:
    initiating a sequence of sensor-detectable events, wherein each event is associated with a corresponding seat within the vehicle;
    determining a sensor output profile from a sensor of the specific mobile computing device based on the sequence of sensor-detectable events; and
    determining the seat location of the specific mobile computing device by correlating the sensor output profile to one of the events in the sequence.

16. The method of claim 15, wherein each sensor-detectable event corresponds to at least one of: generating a magnetic field, causing movement of a corresponding seat, or generating an acoustic signal.

17. The method of claim 12, wherein determining the seat location of the specific mobile computing device includes triangulating the seat location of the vehicle using a radio frequency or acoustic resource of the vehicle.

18. A mobile computing device comprising:
    a short-range wireless port;
    a memory resource storing instructions for implementing vehicle configurations; and
    a processor that, upon executing the instructions, causes the mobile computing device to:
        detect a vehicle within a threshold proximity of the mobile computing device;
        enable entry to the vehicle based at least in part on a stored digital key on the mobile computing device;
        determine profile information for a user of the mobile computing device based on the digital key used for enabling entry to the vehicle;

determine a seat position for the mobile computing device within the vehicle based on a comparison of a sensor output profile of the mobile computing device and a sensor comparison profile for each seat in the vehicle; and configure a specific operational or usage facet of the vehicle based at least in part on profile information stored in the memory resource, the specific operational or usage facet being in closest proximity to the determined seat position.

19. The mobile computing device of claim 18, wherein execution of the instructions to detect the vehicle causes the mobile computing device to:

detect at least one of: the mobile computing device communicating the digital key to unlock the vehicle, a door of the vehicle being opened or closed, or a seat of the vehicle being occupied.

20. The mobile computing device of claim 18, wherein execution of the instructions further causes the mobile computing device to:

configure multiple types of operational or usage facets of the vehicle based at least in part on the profile information.

21. The mobile computing device of claim 18, wherein the seat position corresponds to at least one of: a seat row in which the user of the mobile computing device is determined to be seated, a left or right region of the vehicle in which the user of the mobile computing device is determined to be seated, or a designation of whether the user of the mobile computing device is a driver or a passenger of the vehicle.

22. The mobile computing device of claim 18, wherein execution of the instructions further causes the mobile computing device to:

determine an identity of the user of the mobile computing device based at least in part on the determined seat position.

23. The mobile computing device of claim 18, wherein execution of the instructions to determine the seat position causes the mobile computing device to:

communicate with motion sensors provided with each seat within the vehicle to receive a corresponding seat sensor output profile for each seat;

determine a device sensor output profile from a motion sensor of the mobile computing device;

determine, for each seat, a strength of correlation between the device sensor output profile and the seat sensor output profile for the corresponding seat; and determine the seat position of the mobile computing device based on the strength of correlation determined for each seat.

24. The mobile computing device of claim 18, wherein execution of the instructions to determine the seat position causes the mobile computing device to:

initiate a sequence of sensor-detectable events, wherein each event is associated with a corresponding seat within the vehicle;

determine a sensor output profile from a sensor of the mobile computing device based on the sequence of sensor-detectable events; and determining the seat position of the mobile computing device by correlating the sensor output profile to one of the events in the sequence.

25. The mobile computing device of claim 18, wherein the mobile computing device communicates with one or more other devices within the vehicle using a wireless, peer-to-peer connection.

26. A vehicle comprising:
a controller;
a set of interfaces for controlling operational and usage facets of the vehicle;
a short-range wireless port;
a sensor input or output resource provided with or in proximity to each seat;
wherein the controller operates to:
determine a sensor comparison profile for each seat from the sensor input or output resource provided with or in proximity to each seat;
determine a sensor output profile from a motion sensor of each mobile computing device in a set of mobile computing devices;
determine a seat position of each mobile computing device of the set based on a comparison of the sensor output profile from the motion sensor of each of the mobile computing devices of the set and the sensor comparison profile for each seat;
obtain profile information from one or more of the mobile computing devices in the set; and
initiate, through the set of interfaces, configuration of multiple operational or usage facets of the vehicle, including configuration of a specific operational or usage facet using profile data of the mobile computing device in the set that is at the seat position which is in closest proximity to the specific operational or usage facet.

27. The vehicle of claim 26, wherein the sensor input or output resource provided with or in proximity to each seat includes a seat sensor provided with each seat, and wherein the sensor comparison profile is determined from a seat sensor output profile generated by each seat sensor over a duration of time;

wherein the controller determines the seat position of each mobile computing device of the set using seat correlation logic that compares the seat sensor output profile generated by each seat sensor with the sensor output profile from the motion sensor of each of the mobile computing devices of the set.

28. The vehicle of claim 26, wherein the sensor input or output resource provided with or in proximity to each seat includes a sensor output resource that generates a sensor-detectable event at or near each seat, and wherein the sensor comparison profile identifies a sequence of the sensor-detectable events at or near each seat;

wherein the controller determines the seat position of each mobile computing device of the set using position determination logic that compares the sensor comparison profile with the sensor output profile from the motion sensor of each of the mobile computing devices of the set.

29. A vehicular system comprising:
a vehicle sub-system comprising a controller, a set of interfaces to for controlling operational and usage facets of the vehicle, a short-range wireless port, and a sensor input or output resource provided with or in proximity to each seat of the vehicle;
a set of multiple mobile computing devices, each mobile computing device including a processor, a memory resource and a motion sensor;
wherein the vehicle sub-system and each of the set of multiple computing devices operate a communication platform for communicating with each other in order to establish a network of multiple devices within the vehicle;

wherein at least one of the multiple devices of the network is configured to:

operates the input or output resource to generate a sensor comparison profile for each seat;

determines a sensor output profile for a specified duration from the motion sensor of each of the mobile computing devices of the set;

use one of position determination logic or sensor correlation logic to determine a seat position of each mobile computing device of the set;

obtain profile information from one or more of the mobile computing devices in the set; and initiates, from the controller of the vehicle sub-system through the set of interfaces, configuration of multiple operational or usage facets of the vehicle, including configuration of a specific operational or usage facet using profile data of the mobile computing device in the set that is at the seat position which is in closest proximity to the specific operational or usage facet.

30. The method of claim 1, further comprising:

determining second profile information for a user of a second specific mobile computing device which is in closest proximity to a second specific operational or usage facet of the vehicle;

configuring the second specific operational or usage facet of the vehicle based at least in part on the second profile information.

31. The mobile computing device of claim 18, wherein execution of the instructions further causes the mobile computing device to:

detect a presence of another mobile computing device within the vehicle;

determine second profile information for a user of the other mobile computing device;

determine a second seat position for the other mobile computing device within the vehicle; and configure at least one of an operational or usage facet of the vehicle at the second seat position based at least in part on the second profile information.

* * * * *